United States Patent
Kim et al.

(10) Patent No.: US 10,078,966 B2
(45) Date of Patent: Sep. 18, 2018

(54) WARNING METHOD OUTSIDE VEHICLE, DRIVER ASSISTANCE APPARATUS FOR EXECUTING METHOD THEREOF AND VEHICLE HAVING THE SAME

(71) Applicant: LG ELECTRONICS INC., Seoul (KR)

(72) Inventors: Seonghwan Kim, Seoul (KR); Jinhua Piao, Seoul (KR); Minji Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/312,397

(22) PCT Filed: Dec. 10, 2015

(86) PCT No.: PCT/KR2015/013523
§ 371 (c)(1),
(2) Date: Nov. 18, 2016

(87) PCT Pub. No.: WO2017/094952
PCT Pub. Date: Jun. 8, 2017

(65) Prior Publication Data
US 2018/0033306 A1    Feb. 1, 2018

(30) Foreign Application Priority Data

Dec. 2, 2015 (KR) .................. 10-2015-0170940

(51) Int. Cl.
*G08G 1/16* (2006.01)
*G08G 1/005* (2006.01)
*B60Q 5/00* (2006.01)

(52) U.S. Cl.
CPC ............ *G08G 1/166* (2013.01); *B60Q 5/006* (2013.01); *G08G 1/005* (2013.01)

(58) Field of Classification Search
CPC ........ G08G 1/166; G08G 1/162; G08G 1/163; G08G 1/005; G08G 1/096716; B60Q 5/006
See application file for complete search history.

(56) References Cited

U.S. PATENT DOCUMENTS

| 2011/0133954 A1 | 6/2011 | Ooshima et al. |
| 2015/0035685 A1* | 2/2015 | Strickland .............. B60Q 9/008 340/901 |

FOREIGN PATENT DOCUMENTS

| JP | 2011-138476 A | 7/2011 |
| JP | 2012-48537 A | 3/2012 |

(Continued)

*Primary Examiner* — Hongmin Fan
(74) *Attorney, Agent, or Firm* — Birch, Stewart, Kolasch & Birch, LLP

(57) ABSTRACT

A driver assistance apparatus in a vehicle, the driving assistance apparatus including a sensor unit configured to sense a surrounding of the vehicle; an alarm unit on the vehicle configured to output an alarm outside of the vehicle; a transceiver configured to provide wireless communication; and a processor configured to detect a person included in the sensed surrounding of the vehicle is in an alarm situation, control the transceiver to transmit an alarm signal to a mobile terminal of the person to inform the person he or she is in the alarm situation in response to a successful attempt to communicate with the mobile terminal of the person, and output an alarm via the alarm unit towards the person to inform the person he or she is in the alarm situation in response to an unsuccessful attempt to communicate with the mobile terminal of the person.

20 Claims, 26 Drawing Sheets

(56) References Cited

FOREIGN PATENT DOCUMENTS

| | | |
|---|---|---|
| JP | 2014-164484 A | 9/2014 |
| JP | 2015-197785 A | 11/2015 |
| KR | 10-1478951 B1 | 1/2015 |

* cited by examiner

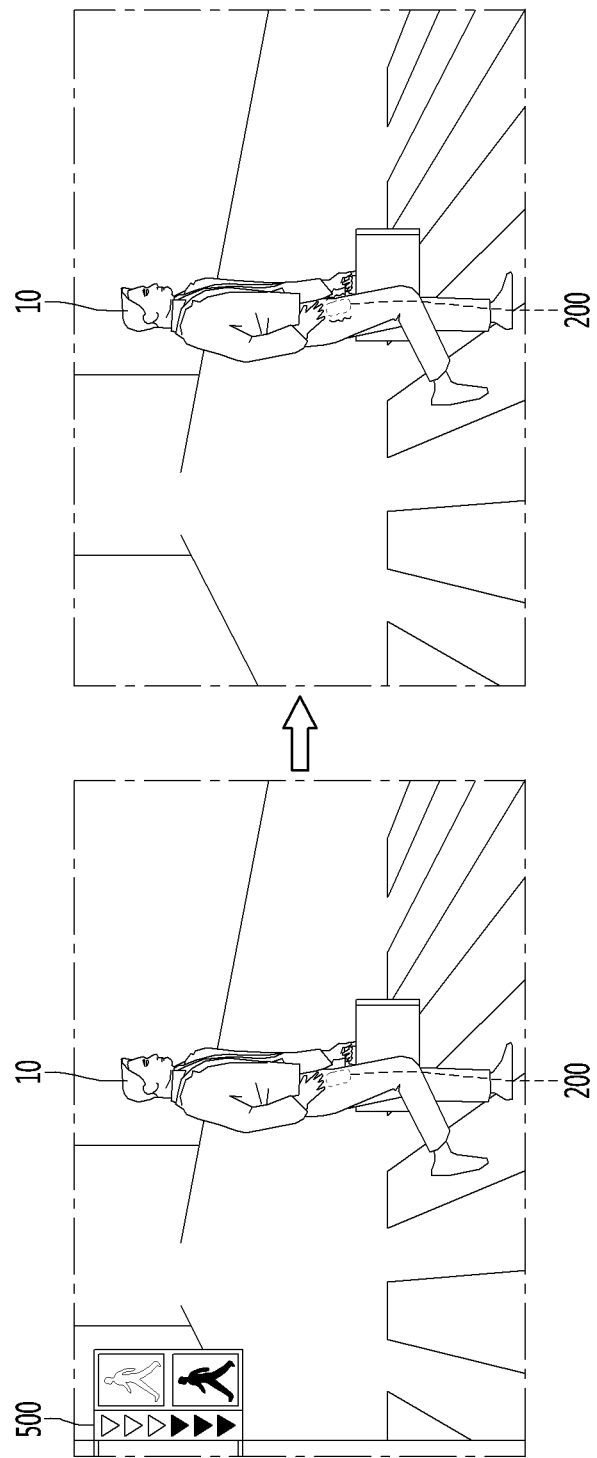

WARNING METHOD OUTSIDE VEHICLE, DRIVER ASSISTANCE APPARATUS FOR EXECUTING METHOD THEREOF AND VEHICLE HAVING THE SAME

CROSS REFERENCE TO THE RELATED APPLICATIONS

This application is the National Phase of PCT International Application No. PCT/KR2015/013523, filed on Dec. 10, 2015, which claims priority under 35 U.S.C. 119(a) to Patent Application No. 10-2015-0170940, filed in Korea on Dec. 2, 2015, all of which are hereby expressly incorporated by reference into the present application.

BACKGROUND OF THE INVENTION

Field of the Invention

The present disclosure relates to a vehicle's outside alarm method, a driver assistance apparatus performing the same, and a vehicle including the driver assistance apparatus.

Description of the Related Art

A vehicle is an apparatus that moves a user in a direction in which he or she wants to go. A representative example of the vehicle may be a car. Cars are classified into an internal combustion engine car, an external combustion engine car, a gas turbine car, and an electric vehicle according to a used motor.

The electric vehicle refers to a car that operates an electric motor by using electricity as energy, and includes a pure electric vehicle, a hybrid electric vehicle (HEV), a plug-in hybrid electric vehicle (PHEV), a fuel cell electric vehicle (FCEV) or the like.

In recent, an intelligent vehicle is being actively developed for the safety or convenience of a driver, a pedestrian or the like. The intelligent vehicle is a state-of-the-art vehicle to which an information technology (IT) has been applied, and is also referred to as a smart vehicle. The intelligent vehicle provides the optimal traffic efficiency through introduction of the state-of-the-art system of a vehicle itself and a link to an intelligent transport system (ITS).

For example, the intelligent vehicle has a technical advantage in that the safety of a pedestrian as well as a driver or a passenger is maximized due to the development of a core technology related to safety, such as an adaptive cruise control (ACC), an obstacle detector, a collision detector or reducer, or the like.

However, the current technologies are limited to the technology of a vehicle itself, such as notifying a vehicle driver of the detected surrounding situation or vehicle control reflecting the surrounding situation. Thus, there is a limitation in that it is difficult to effectively deliver information on sensed dangerous situations to external pedestrians or other vehicles.

As a method of delivering, by a vehicle user, his intention to the outside, only a method of outputting his horn to random people is being currently used. However, there are limitations in that the horn may not effectively deliver a user's intention and may cause noise pollution to untargeted people.

SUMMARY OF THE INVENTION

Embodiments provide a vehicle's outside alarm method that may effectively provide an alarm to an alarm target around the vehicle, a driver assistance apparatus that performs the method, and a vehicle including the driver assistance apparatus.

In an embodiment, an outside alarm method for a vehicle includes sensing an alarm situation; determining an alarm target to which the alarm is provided in the alarm situation; acquiring state information on the determined alarm target; determining an alarm unit that outputs the alarm and an alarm method of the alarm unit according to the state information on the alarm target; and outputting, by the detected alarm unit, the alarm by using the determined alarm method, wherein the alarm unit is at least one of a terminal output unit in a terminal of the alarm target or an outside alarm output unit of the vehicle.

In another embodiment, a driver assistance apparatus includes a sensor unit configured to sense the surrounding of a vehicle; a processor configured to detect an alarm situation based on the surrounding of the vehicle sensed; an outside alarm unit configured to output an alarm according to the alarm situation; and a communication unit configured to transmit an alarm signal for the alarm situation, wherein the processor is configured to: obtain state information on an alarm target, determine an alarm method according to the state information on the alarm target, and output an alarm according to the determined alarm method.

Another embodiment provides a vehicle including the above-described driver assistance apparatus.

A method of sounding the alarm to the outside of a vehicle according to an embodiment may provide an alarm in an effective alarm manner according to the state of an alarm target.

Also, the method according to an embodiment may output the visual and/or audible alarm only to an alarm target according to state information to effectively provide an alarm to the alarm state without causing the visual or noise pollution around the vehicle.

Also, the method according to an embodiment may provide a message including alarm information exceeding a simple warning to deliver a clear intention to an alarm target. Also, a driver assistance apparatus according to an embodiment has an advantage in that it is possible to decrease the danger of a traffic accident and provide a smooth driving condition because the driver assistance apparatus sounds the alarm by using the most effective unit and method based on state information on an alarm target to enable smooth communication.

BRIEF DESCRIPTION OF THE DRAWINGS

FIG. 13b is a particular example of the alarm situation in FIG. 13a.

FIG. 14b is another particular example of the alarm situation in FIG. 13a.

FIG. 15b is another particular example of the alarm situation in FIG. 13a.

FIGS. 16c and 16d and FIG. 17 represent state information on each of alarm targets on the left hand and examples of outputting the alarm according to state information on the right hand.

DETAILED DESCRIPTION OF THE EMBODIMENTS

Figure 1:
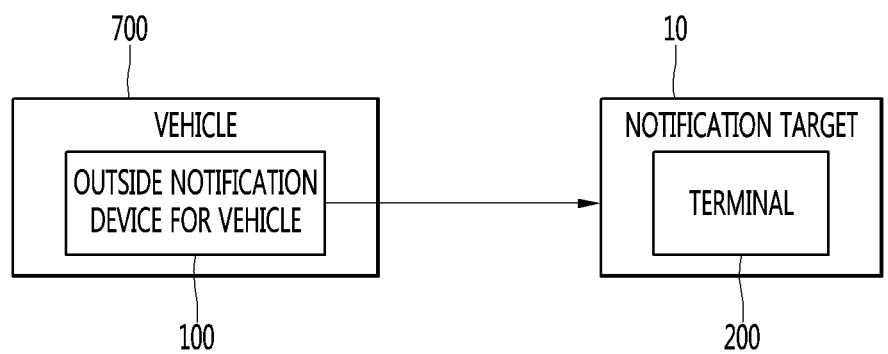
FIG. 1 is a block diagram of a vehicle's outside alarm system according to an embodiment.

Hereinafter, embodiments are described in detail with reference to the accompanying drawings and regardless of the numbers of the drawings, same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. In describing the embodiments disclosed in the present disclosure, detailed descriptions of related known technologies will be omitted because they would obscure the subject of the embodiments disclosed in the present disclosure. Also, the accompanying drawings are used to help easily understanding embodiments disclosed herein but the technical idea disclosed in the present disclosure is not limited thereto. It should be understood that all of variations, equivalents or substitutes contained in the concept and technical scope of the inventive concept are also included.

Although the terms 'first' and 'second' may be used to describe various components, these components should not be limited to these terms. The terms are used only in order to distinguish a component from another component. When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms in singular form include the plural form unless otherwise specified. It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

The terminal described in the present disclosure may include a mobile phone, a smart phone, a laptop computer, a terminal for digital broadcasting, a personal digital assistant (PDA), a portable multimedia player (PMP), a navigation device, a slate PC, a tablet PC, an ultrabook, a wearable device (e.g., a smartwatch, smart glasses, a head mounted display (HMD)), or the like.

A vehicle discussed in the present disclosure may include a car or motorcycle. In the following, the car of the vehicle is mostly discussed. The vehicle discussed in the present disclosure may include all of an internal combustion engine vehicle that includes an engine as a power source, a hybrid vehicle that includes an engine and an electrical motor as a power source, and an electrical vehicle that includes an electrical motor as a power source.

In the following description, the right side of the vehicle unit the left side of the driving direction of the vehicle and the right side of the vehicle unit the right side of the driving direction of the vehicle. In the following description, a left hand drive (LHD) vehicle is mostly described unless mentioned to the contrary.

In the following, a driver assistance apparatus according to an embodiment is described in detail with reference to the accompanying drawings. Referring to FIG. 1, a vehicle's outside alarm system according to an embodiment includes a vehicle 700 that includes a driver assistance apparatus 100, and an alarm target 10. In addition, the alarm target 10 may include a terminal 200 that may perform communication according to the situation.

Specifically, the vehicle 700 may include the driver assistance apparatus 100 for executing a vehicle's outside alarm function that sounds the alarm to the alarm target 10 outside the vehicle. The driver assistance apparatus 100 is a separate apparatus and may execute the vehicle's outside alarm function that outputs the alarm to the alarm target 10 outside the vehicle, transmitting and receiving necessary information through data communication with the vehicle 700.

Alternatively, when a set of at least some of units of the vehicle 700 (See FIG. 18) execute the vehicle 700 outside alarm function, it is also possible to define the set of units for executing the vehicle's outside alarm function as the driver assistance apparatus 100.

When the driver assistance apparatus 100 is the separate apparatus, some of the units of the driver assistance apparatus 100 may not be included in the driver assistance apparatus 100 but may be the units of the vehicle 700 or of another apparatus loaded in the vehicle 700. By transmitting and receiving data through an interface unit of the driver assistance apparatus 100, these units may be understood to be included in the driver assistance apparatus 100.

For the convenience of description, it is described below that the driver assistance apparatus 100 directly includes the units shown in FIG. 2. Such a driver assistance apparatus 100 may obtain state information on the alarm target 10, determine an alarm unit and an alarm method based on the state information on the alarm target 10, and provide an alarm to the alarm target 10 through the determined alarm unit and alarm method.

In particular, the driver assistance apparatus 100 may determine whether to be capable of transmitting an alarm signal for outputting the alarm from the terminal 200 of the alarm target 10 through state information, output the alarm through the terminal 200 when it is possible to transmit, and provide an alarm through an outside alarm unit when it is difficult to transmit, thus it is possible to effectively provide an alarm to the alarm target 10.

Here, the alarm target 10 may is a person to whom the vehicle sounds the alarm, and may include another vehicle and two-wheeled vehicle on which a person has ridden, as well as a pedestrian. Such an alarm target 10 may possess the terminal 200. For example, the pedestrian may possess the mobile terminal 200 and the other vehicle or two-wheeled vehicle may include a navigation device, a cluster or other terminals 200.

In addition, the state information on the alarm target 10 may include at least one of pieces of information on whether to be capable of performing communication with the terminal 200 of the alarm target 10, the usage state of the terminal 200 of the alarm target 10, the directional relationship and distance between the vehicle and the alarm target 10, and the moving direction of the alarm target 10.

Figure 2:
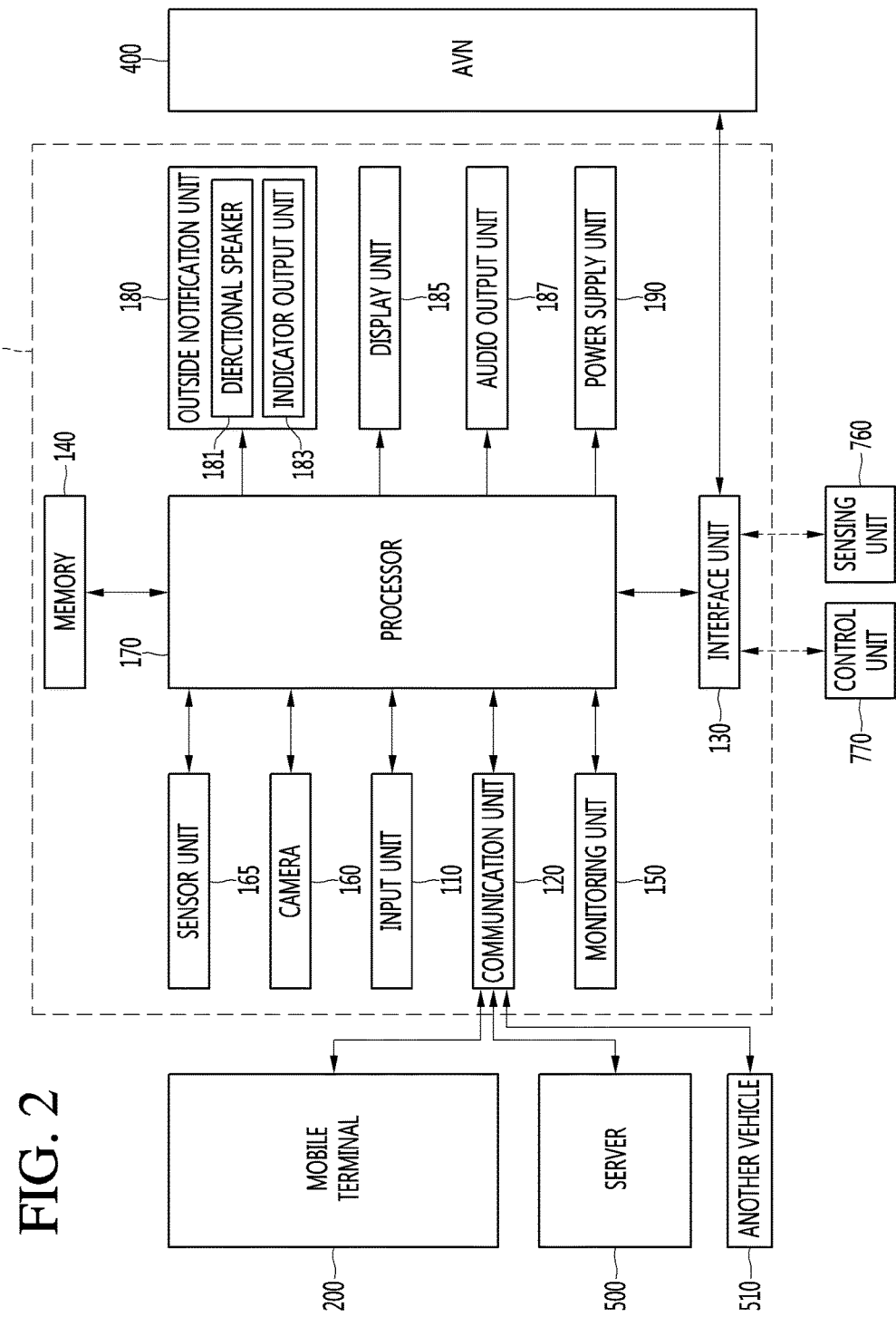
FIG. 2 is a block diagram of a driver assistance apparatus for executing a vehicle's outside alarm function according to an embodiment.

Specifically, referring to FIG. 2, such a driver assistance apparatus 100 may include an input unit 110, a communication unit 120, the interface unit 130, a memory 140, a monitoring unit 150, a camera 160, a sensor unit 165, a processor 170, an outside alarm unit 180, a display unit 185, an audio output unit 187, and a power supply unit 190.

However, since the units of the driver assistance apparatus 100 shown in FIG. 2 are not essential for implementing the driver assistance apparatus 100, the driver assistance apparatus 100 described in the present disclosure may have more or less components than those enumerated above.

In order to describe the driver assistance apparatus, the driver assistance apparatus 100 may include the input unit 110 that senses a user's input. Specifically, a user may set the function of the driver assistance apparatus or turn on/off the power supply of the driver assistance apparatus 100, through the input unit 110. For example, the input unit 110 may sense the alarm input of the user.

Figure 3:
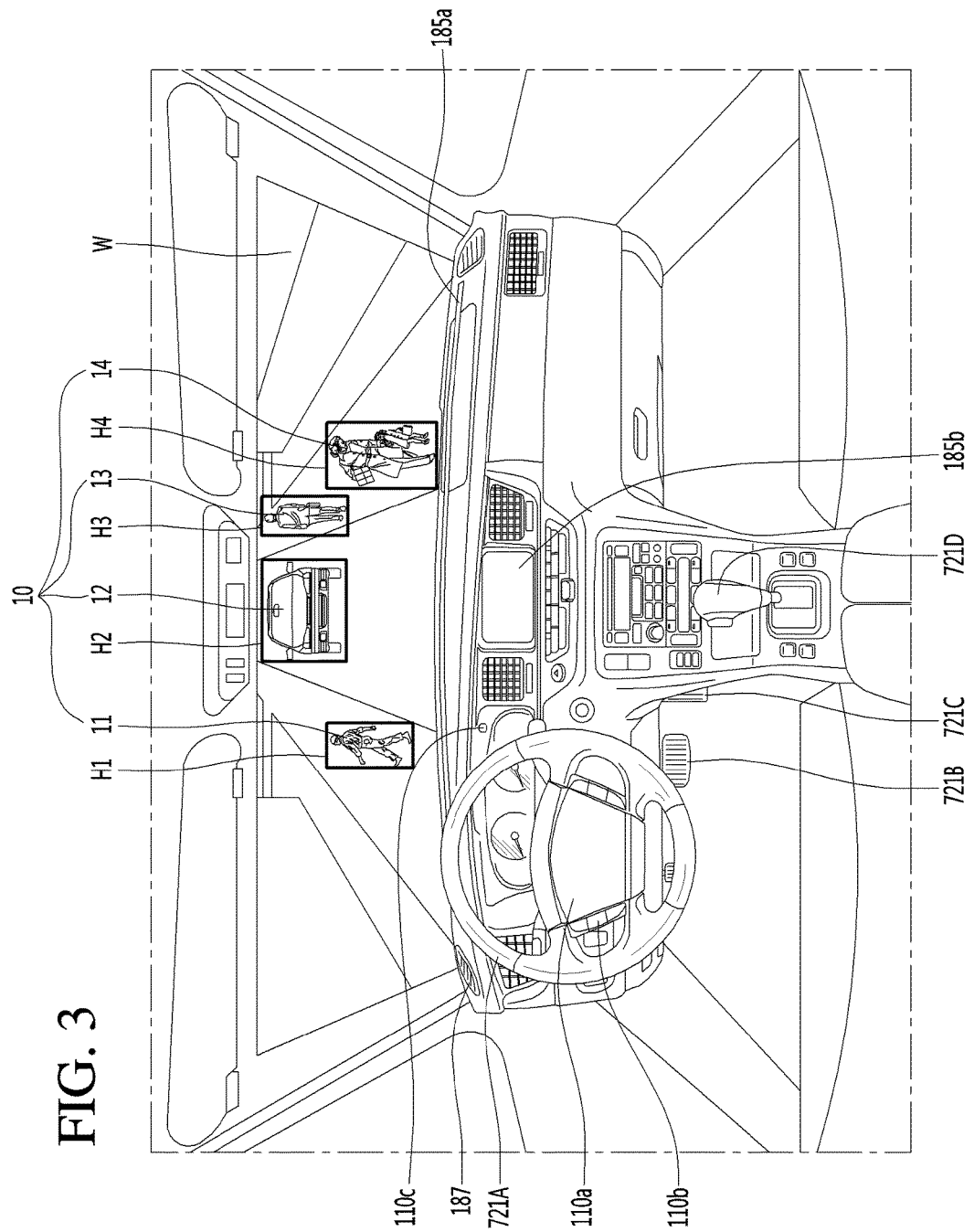
FIG. 3 is a diagram showing the interior of a vehicle that includes a driver assistance apparatus according to an embodiment.

Referring to FIG. 3, the input unit 110 may include at least one of a horn input unit 110a, a first selection/input unit 110b and a second selection/input unit 110c. Specifically, the horn input unit 110a may be disposed on the steering actuating unit 721A of the vehicle and sense the push input of the user for alarm initiation. In addition, the driver assistance apparatus 100 may execute the vehicle's outside alarm function if the alarm initiation input of the user is sensed through the horn input unit 110a.

However, even without the user input, the processor 170 may automatically determine a situation requiring an alarm based on at least one of image information, sensor information, communication information, and monitoring information. For example, the processor 170 may automatically start sounding the vehicle's outside alarm when the alarm target 10 that is in danger of collision is detected through image information and sensor information.

Also, the first selection/input unit 110b may be disposed on the steering actuating unit 721A of the vehicle and sense the touch input of the user for selecting the alarm target 10. Specifically, when the candidate alarm target 10 that is sensed outside is in plurality, the driver assistance apparatus 100 may sense user selection/input on the alarm target 10 through the first selection/input unit 110b to specify the alarm target 10.

For example, if sensing first to fourth candidate alarm targets 11 to 14 the driver assistance apparatus 100 may display images H1 to H4 displaying the candidate alarm targets 11 to 14 through a display, and provide an alarm target 10 selection interface that receives selection/input on the alarm target 10 from the user through the first selection/input unit 110b.

Also, the second selection/input unit 110c may sense the gesture input of the user, such as the hand direction or eyesight direction of the user for alarm target 10 selection. For example, such a second selection/input unit 110c is an image acquisition module of the monitoring unit 150, and may capture an image of the eyesight or hand of the user for alarm target 10 selection, analyze the captured image and sense the gesture input of the user.

Likewise, the driver assistance apparatus 100 may sense a user selection/input on the alarm target 10 through the second selection/input unit 110c and specify the alarm target 10. Also, even without the user input, the processor 170 may automatically specify a target to whom the user desires to deliver the alarm based on at least one of image information, sensor information, communication information, and monitoring information.

For example, the processor 170 may automatically specify the nearest candidate alarm target 10 to the vehicle as the alarm target or configure objects that are in danger of collision, as the alarm target 10. Such an input unit 110 includes at least one of a gesture input unit (e.g., an optical sensor) that senses a user gesture, a touch input unit (e.g., a touch sensor, a touch key, or a mechanical key) that senses a touch, and a microphone that senses a voice input, to be capable of sensing a user input.

Next, the driver assistance apparatus 100 may include the communication unit 120 that communicates with another vehicle 510, a terminal 200, a server 500, or the like.

The communication unit 120 may receive, as communication information, at least one of navigation information, driving information on the other vehicle, and traffic situation information, and acquire state information on the alarm target 10 through the information. That is, the driver assistance apparatus 100 may acquire the state information on the alarm target 10 through the communication information obtained through the communication unit 120.

For example, the processor 170 may determine through the communication unit 120 whether the alarm target 10 may communicate with the terminal 200 capable of outputting the alarm, in order to determine whether there is the alarm target 10 and whether it is possible to communicate with the terminal 200 of the alarm target 10.

Specifically, if the terminal 200 occupying the position of an object receives wireless data from the communication unit 120 and transmits a corresponding feedback signal, the processor 170 may determine that the object possessing the terminal 200 is the alarm target 10 and there is a situation in which it is possible to perform alarm communication with the terminal 200 of the alarm target 10.

Also, the processor 170 may obtain, from the feedback signal, information on terminal 200 screen activation, sound activation, telephone conversation mode activation and music mode activation and acquire state information on the alarm target 10. Also, the driver assistance apparatus 100 may transmit an alarm signal to the terminal 200 of the alarm target 10 through the communication unit 120.

For example, the driver assistance apparatus 100 may transmit, through the communication unit 120, the alarm signal requesting that at least one of visual, tactile and audible alarms should be output. In this case, the alarm signal may include alarm information acquired from the driver assistance apparatus 100. Here, the alarm information may include at least one of intention information that the user desires to deliver to the alarm target 10, traffic information around the alarm target 10, an action recommended for the alarm target 10, and the situation around the alarm target 10.

For example, the driver assistance apparatus 100 may transmit, through the communication unit 120, the alarm signal that displays, on the terminal 200 of a pedestrian, surrounding signal information along with the alarm requesting to stop moving and look around, and outputs the audible alarm. In addition, the communication unit 120 may receive at least one of position information, weather information, and road traffic information (e.g., transport protocol expert group (TPEG) information) from the mobile terminal 200 and/or the server 500.

Also, the communication unit 120 may receive traffic information from the server 500 that includes an intelligent transport system (ITS). Here, the traffic information may include traffic light information, lane information or the like. Also, the communication unit 120 may receive navigation information from the server 500 and/or the mobile terminal 200.

Here, the navigation information may include at least one of map information relating to vehicle driving, lane information, position information on the vehicle, preset destination information, and route information depending on a destination. In particular, the communication unit 120 may receive the real-time position of the vehicle by using navigation information. For example, the communication unit 120 may include a global positioning system (GPS) module or a wireless fidelity (WiFi) module to acquire the position of the vehicle.

Also, the communication unit 120 may receive, from the other vehicle 510, driving information on the other vehicle 510 and transmit driving information on the vehicle to share driving information with vehicles. Here, driving information that is shared may include at least one of direction information, position information, vehicle speed information, acceleration information, travel route information, forward/backward movement information, adjacent vehicle information, and turn signal information.

Also, when a user is in the vehicle, the mobile terminal 200 of the user and the driver assistance apparatus 100 may also perform pairing automatically or by the execution of an application by the user. The communication unit 120 may exchange data with the other vehicle 510, the mobile terminal 200 or the server 500 wirelessly.

The communication unit may perform wireless communication by using wireless data communication. The wireless data communication may use technical standards or communication techniques for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A)).

Also, the communication unit 120 may use a wireless internet technology, which may include e.g., wireless LAN (WLAN), Wi-Fi, Wi-Fi Direct, digital living network alliance (DLNA), wireless broadband (WiBro), world interoperability for microwave access (WiMAX), HSDPA, HSUPA, LTE, LTE-A, etc. Also, the communication unit 120 may use short-range communication and may support short-range communication by using at least one of e.g., Bluetooth™, radio frequency identification (RFID), infrared data association (IrDA), ultra wideband (UWB), ZigBee, near field communication (NFC), Wi-Fi, Wi-Fi Direct, and wireless universal serial bus (wireless USB) technologies.

In addition, the driver assistance apparatus may use the short range communication to perform pairing with the mobile terminal 200 in the vehicle, and use a wireless communication module in the mobile terminal 200 to exchange data with another vehicle and a server wirelessly. Next, the driver assistance apparatus 100 may include the interface unit 130 that receives vehicle related data or transmits a signal processed or generated by the processor 170 to the outside.

Also, the driver assistance apparatus 100 may exchange a control signal for executing a vehicle's outside alarm function or various pieces of sensed information with the control unit of the vehicle through the interface unit 130. To this end, the interface unit 130 may perform data communication with at least one of a control unit 770, an audio video navigation (AVN) device 400 and a sensing unit 760 inside the vehicle through wired or wireless communication.

Specifically, the interface unit 130 may receive navigation information through data communication with the control unit 770, the AVN device 400 and/or a separate navigation device. Also, the interface unit 130 may receive sensor information from the control unit 770 or the sensing unit 760.

Here, the sensor information may include at least one of vehicle direction information, position information, speed information, acceleration information, tilt information, forward/backward movement information, fuel information, information on the distance to the front and rear vehicles, information on the distance between a vehicle and a lane, and turn signal information.

Also, the sensor information may be acquired from a heading sensor, a yaw sensor, a gyro sensor, a position module, a vehicle's forward/backward movement sensor, a wheel sensor, a vehicle speed sensor, a vehicle-body tilt sensor, a battery sensor, a fuel sensor, a tire sensor, a steering sensor by the rotation of a steering wheel, a vehicle's internal temperature sensor, a vehicle's internal humidity sensor, etc. The position module may include a GPS module for GPS information reception.

In addition, the interface unit 130 may receive a user input received through the user input unit 110 of the vehicle. The interface unit 130 may receive the user input from the user input unit of the vehicle or through the control unit 770. That is, when the input unit is disposed as a component inside the vehicle, it is possible to receive the user input through the interface unit 130.

Also, the interface unit 130 may also receive traffic information acquired from the server 500. The server 500 may be a server that is located at a traffic control center that controls traffic. For example, when the traffic information is received from the server 500 through the communication unit 120 of the vehicle, the interface unit 130 may also receive the traffic information from the control unit 770.

Next, the memory 140 may store various pieces of data for the overall operations of the driver assistance apparatus 100, such as programs for processing or controlling by the processor 170. Specifically, the memory 140 may store many application programs or applications executed on the driver assistance apparatus 100 or data and commands for the operation of the driver assistance apparatus 100. At least some of the application programs may be downloaded from an external server through wireless communication. Also, at least some of the application programs may exist in the driver assistance apparatus 100 for the fundamental functions (e.g., a driver assistance function) of the driver assistance apparatus 100 when the vehicle comes out of the factory.

The application programs may be stored in the memory 140 and installed in the driver assistance apparatus 100 to enable the operation (or function) of the driver assistance apparatus 100 to be executed by the processor 170. Also, the memory 140 may store data for verifying an object in an image. For example, the memory 140 may store data for checking through a certain algorithm what an object is when a certain object is detected from an image around the vehicle that is acquired through the camera 160.

For example, the memory 140 may store data on information on the alarm target 10 or traffic information as data for the object verification. For example, the memory 140 may store traffic information related data for checking through a certain algorithm what an object is when the image acquired through the camera 160 includes the object, such as a pedestrian, another vehicle, or a two-wheeled vehicle.

Also, the memory 140 may store traffic information related data for checking through the certain algorithm what traffic information is when certain traffic information, such as a lane or traffic sign board is detected from the image acquired through the camera 160.

The memory 140 may include, as hardware, at least one of various types of storage mediums, including a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), an static random access memory (SRAM), a read-only memory (ROM), an electrically erasable programmable read-only memory (EEPROM), a programmable read-only memory (PROM), a magnetic memory, a magnetic disk, and an optical disk.

Also, the driver assistance apparatus 100 may also operate in conjunction with a web storage that performs the storage function of the memory 140 on the internet. Next, the driver assistance apparatus 100 may include the monitoring unit 150 that acquires user's biometric information. Specifically, the monitoring unit 150 may sense and acquire user's biometric information.

The biometric information may include image information acquired by capturing an internal image of the vehicle, fingerprint information, iris-scan information, retina-scan information, hand geometry information, facial recognition information, and voice recognition information. That is, the monitoring unit 150 may include sensors that sense the above-described user's biometric information.

For example, the monitoring unit 150 may include an image acquisition module that acquires an image of a user for biometrics. In addition, when the image acquisition module performs biometrics on a user's gesture or eyesight direction, it may be also understood to be included in the input unit 110.

Next, the driver assistance apparatus 100 may include the sensor unit 165 that detects an object around a vehicle. The driver assistance apparatus 100 may include the sensor unit 165 to sense a surrounding object, and may also receive sensor information obtained from the sensor unit 165 of the vehicle itself through the interface unit 130.

The sensor unit 165 may sense an object around the vehicle. In addition, information on the object that the sensor unit 165 senses may be used for acquiring information for identifying the situation around the vehicle, information for specifying the alarm target 10, and state information on the alarm target 10.

Specifically, the sensor unit 165 may sense the surrounding object to sense the position of the object, directional relationship and distance between the object and the vehicle, or the like, and the processor 170 may analyze sensed information to further acquire object information, such as the type, speed and moving direction of the object.

The sensor unit 165 may sense an object that is placed at least one of the front, rear, left and right of the vehicle. To this end, the sensor unit 165 may be disposed at various parts of the vehicle. Specifically, referring to FIG. 4, the sensor unit 165 may be disposed at least one of the front, rear, left and right (165a to 165d) and ceiling 165e of the body of the vehicle 700.

In addition, the sensor unit 165 may include various distance measurement sensors, such as a lidar sensor, a laser sensor, an ultrasonic sensor, a stereo camera, and the like. For example, the sensor unit 165 may be a laser sensor and measure the positional relationship between the vehicle and the object by using time-of-flight (TOF) and/or phase shift according to a laser signal modulation method. Specifically, the TOF may measure the distance and direction to the object by emitting a pulse laser signal and measuring a time when reflected pulse signals from the objects within a measurement range reach a receiver.

The object information for determining whether the object corresponds to the alarm target 10 and alarm information may be obtained in such a manner that the processor 170 analyzes the image captured by the camera 160. Specifically, the driver assistance apparatus 100 may include the camera 160 that captures an image around the vehicle. In addition, the processor 170 may analyze the acquired image around the vehicle, detect an object around the vehicle and determine the attribute of the object to acquire image information.

Here, the image information may include at least one of the type of the object, traffic signal information that the object shows, whether the alarm target 10 possesses the terminal 200, whether the alarm target 10 uses the terminal 200, the usage state of the terminal 200, the distance between the alarm target 10 and the vehicle and the position of the alarm target 10.

Specifically, the processor 170 may perform object analysis, such as analyzing the captured image to detect an object, tracking the object, measuring the distance to the object, verifying the object or the like to generate image information. In order for the processor 170 to more easily perform object analysis, the camera 160 may be a stereo camera that captures an image and measures the distance to the object in the captured image. However, the embodiment is not limited thereto.

In the following, a method of detecting, by the processor 170, position information and image information is described in more detail with reference to FIGS. 5 to 7.

Figure 5:
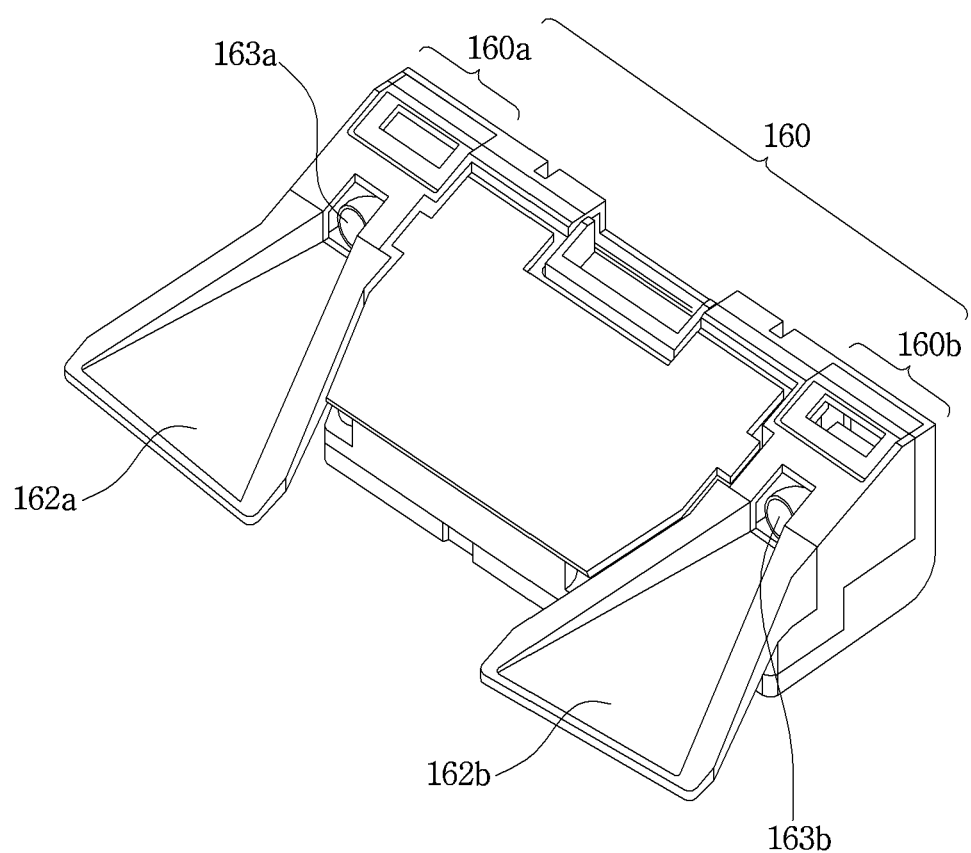
FIG. 5 is an example of a camera according to an embodiment.

Referring first to FIG. 5, the stereo camera 160 may include a first camera 160a including a first lens 163a, and a second camera 160b including a second lens 163b. Also, the stereo camera 160 may further include a first light shield 162a and a second light shield 162b for preventing light from entering the first lens 163a and the second lens 163b, respectively.

Such a driver assistance apparatus 100 may acquire a stereo image around the vehicle from the first and second cameras 160a and 160b, perform disparity detection based on the stereo image, perform object detection on at least one stereo image based on the disparity information, and after the object detection, continue to track the motion of an object.

Figure 6:
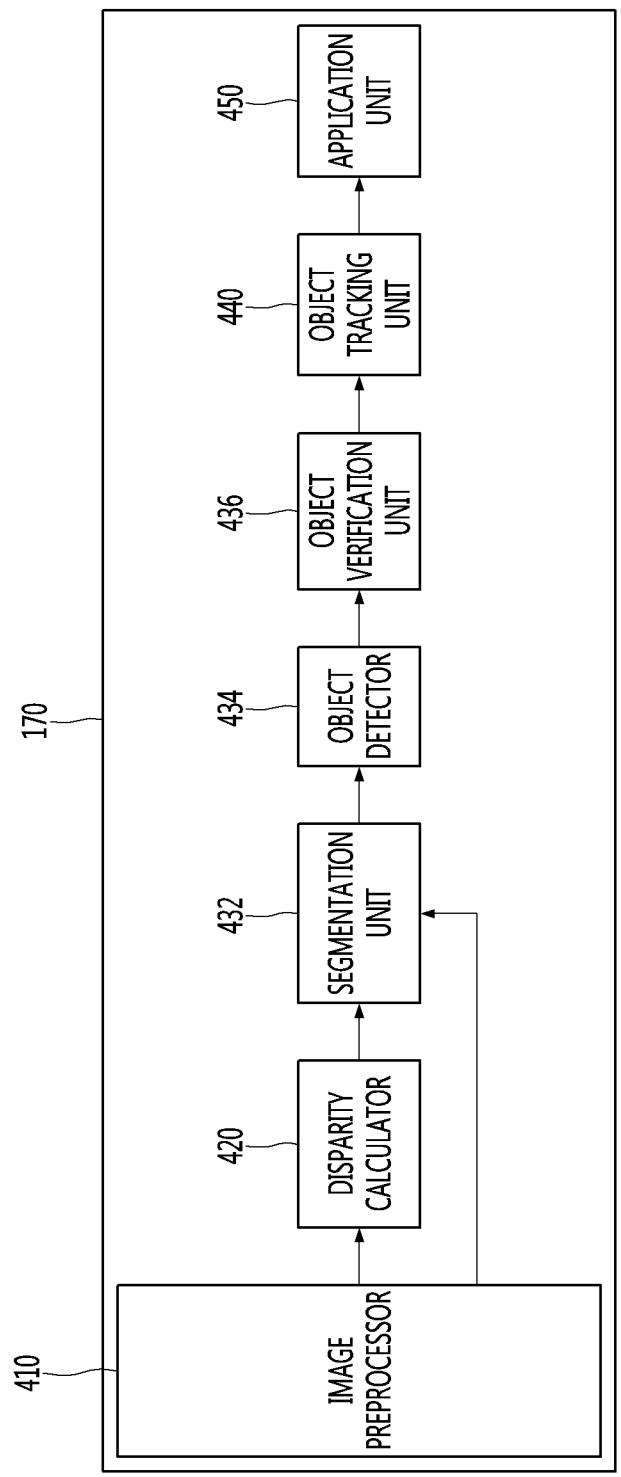
FIGS. 6 and 7 are diagrams for explaining an example of a method of obtaining information from an image according to an embodiment.

FIG. 6 is an example of an internal block diagram of the processor 170. As shown, the processor 170 in the driver assistance apparatus 100 may include an image preprocessor 410, a disparity calculator 420, an object detector 434, an object tracking unit 440, and an application unit 450. Although in FIG. 5 and the following description, it is described that an image is processed in the order of the image preprocessor 410, the disparity calculator 420, the object detector 434, the object tracking unit 440, and the application unit 450, an embodiment is not limited thereto.

The image preprocessor 410 may receive an image from the camera 160 to perform preprocessing. In particular, the image preprocessor 410 may perform, on the image, noise reduction, rectification, calibration, color enhancement, color space conversion (CSC), interpolation, camera 160 gain control, or the like. Thus, it is possible to acquire an image clearer than a stereo image captured by the camera 160.

The disparity calculator 420 may receive an image signal-processed by the image preprocessor 410, perform stereo matching on the received image, and acquire a disparity map according to stereo matching. That is, it is possible to acquire disparity information on a stereo image in front of a vehicle.

In this case, the stereo matching may be performed on a pixel or predetermined block basis of the stereo images. The disparity map may mean a map that represents, by a numerical value, binocular parallax information on the stereo images, i.e., left and right images.

A segmentation unit 432 may perform segment and clustering on at least one of images based on disparity information from the disparity calculator 420. In particular, the segmentation unit 432 may separate the background from the foreground for at least one of stereo images based on the disparity information.

For example, it is possible to calculate, an area of the disparity map in which the disparity information is less than or equal to a predetermined value, as the background and exclude a corresponding part. Thus, the foreground may be relatively separated. As another example, it is possible to calculate, an area of the disparity map in which the disparity information is equal to or greater than a predetermined value, as the foreground and extract a corresponding part. Thus, the foreground may be separated.

As such, by separating the foreground from the background based on the disparity information extracted based on the stereo image, it is possible to reduce a signal processing speed, a signal processing amount, or the like when an object is detected later.

Next, the object detector 434 may detect an object based on an image segment from the segmentation unit 432. That is, the object detector 434 may detect an object from at least one of images, based on the disparity information. In particular, the object detector 434 may detect an object from at least one of images. For example, it is possible to detect an object from the foreground separated by the image segment.

Next, the object verification unit 436 may classify and verify the separated object. To this end, the object verification unit 436 may use an identification method using a neural network, a support vector machine (SVM) method, an identification method by AdaBoost using Haar-like features, a histograms of oriented gradients (HOG) method, or the like.

The object verification unit 436 may compare objects stored in the memory 140 with detected objects to verify an object. For example, the object verification unit 436 may verify a surrounding vehicle, lane, road surface, signpost, dangerous area, tunnel or the like around a vehicle.

The object tracking unit 440 may perform tracking on the verified object. For example, it is possible to verify objects in acquired stereo images, calculate the motion or motion vector of the verified objects, and track the movement of a corresponding object based on the calculated motion or motion vector, sequentially. Thus, it is possible to track the surrounding vehicle, lane, road surface, signpost, dangerous area, tunnel or the like around the vehicle.

Next, the application unit 450 may calculate the degree of risk of the vehicle based on various objects around the vehicle, such as another vehicle, lane, road surface, signpost or the like. Also, it is possible to calculate collision possibility with the front car, whether the vehicle slips, or the like.

In addition, based on the calculated degree of risk, collision possibility or slipping possibility, the application unit 450 may output, as driver assistance information, a message for notifying a user of such information. Alternatively, it is also possible to generate, a control signal for posture control or driving control of a vehicle, as vehicle control information.

The image pre-processor 410, the disparity calculator 420, the segmentation unit 432, the object detector 434, the object verification unit 436, the object tracking unit 440 and the application unit 450 may be the internal components of the image processor (See FIG. 18) in the processor 170.

According to an embodiment, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or around view camera 160, the disparity calculator 420 may be excluded. According to an embodiment, the segmentation unit 432 may also be excluded.

Figure 7:
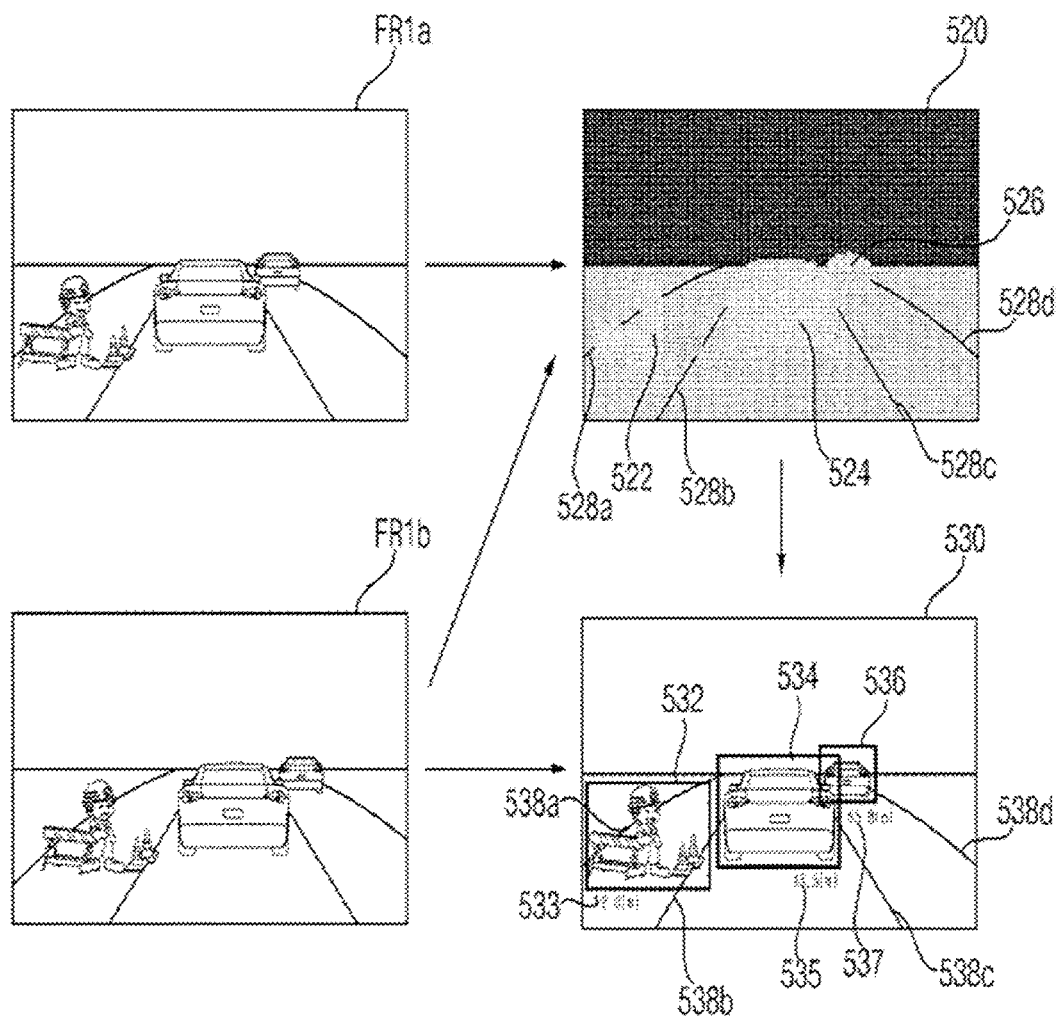

Referring to FIG. 7, the camera 160 may acquire a stereo image for a first frame section. The disparity calculator 420 in the processor 170 may receive stereo images FR1a and FR1b signal-processed by the image preprocessor 410, and perform stereo matching on the received stereo images FR1a and FR1b to acquire a disparity map 520.

The disparity map 520 represents parallax between the stereo images FR1a and FR1b according to level, and it is possible to calculate that the higher a disparity level is, the shorter a distance to a vehicle is, and the lower the disparity level is, the longer the distance to the vehicle is. When such a disparity map is displayed, the disparity map may also be displayed to have high luminance the higher the disparity level is and to have low luminance the lower the disparity level is.

FIG. 7 illustrates that in the disparity map 520, first to fourth lanes 528a to 528d respectively have corresponding disparity levels, and a construction area 522, a first front vehicle 524, and a second front vehicle 526 respectively have corresponding disparity levels. The segmentation unit 432, the object detector 434, and the object verification unit 436 perform segment, object detection, and object verification on at least one of the stereo images FR1a and FR1b based on the disparity map 520.

FIG. 7 illustrates how to detect and verify an object on the second stereo image FR1*b* by using the disparity map 520. That is, in an image 530, object detection and verification may be performed on first to fourth lanes 538*a* to 538*d*, a construction area 532, a first front vehicle 534, and a second front vehicle 536.

Through the image processing, the processor 170 may accurately sense what the surrounding object is, whether there is a need for an alarm, whether the object corresponds to the alarm target 10, whether the alarm target 10 is seeing the terminal 200, whether the object is performing a telephone conversation, or whether the object is wearing an earphone, and acquire state information on the alarm target 10.

That is, the driver assistance apparatus 100 may detect, through image information, whether it is a situation that needs an alarm and the alarm target 10, and may detect state information on the alarm target 10 and what alarm information is displayed to the alarm target 10.

The camera 160 may also include an internal camera that captures an image around the vehicle inside the vehicle to acquire an image. Also, the camera 160 may also be disposed at various positions outside the vehicle.

Figure 4:
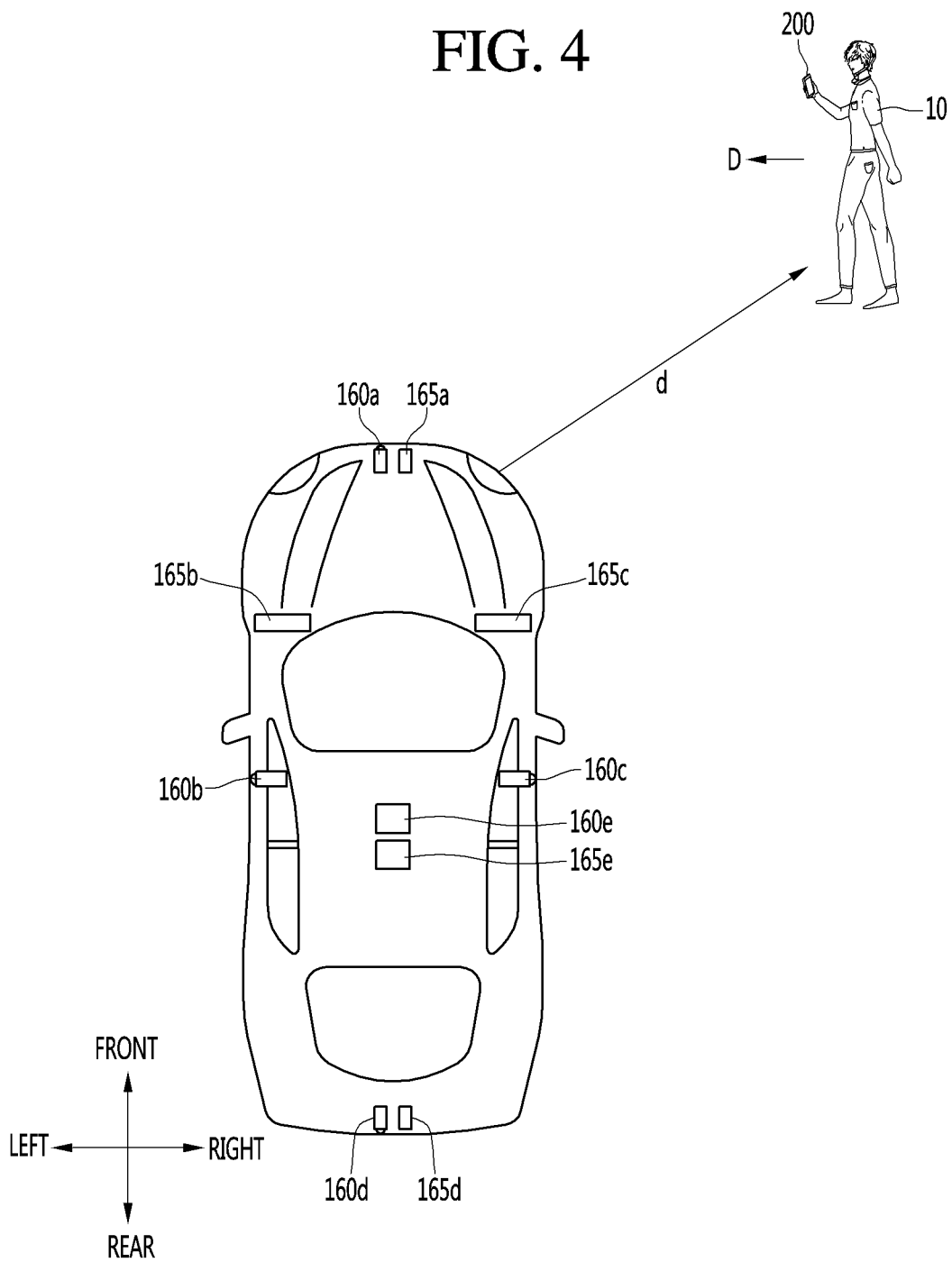
FIG. 4 is a diagram for explaining a sensor according to an embodiment.

Referring to FIG. 4, a plurality of cameras 160 may be disposed at at least one of the left, rear, right, front, and ceiling of the vehicle, respectively. A left camera 160*b* may be disposed in a casing that surrounds a left side mirror. Alternatively, the left camera 160*b* may be disposed outside the casing that surrounds the left side mirror. Alternatively, the left camera 160*b* may also be disposed on an area outside a left front door, a left rear door or left fender.

A right camera 160*c* may be disposed in a casing that surrounds a right side mirror. Alternatively, the right camera 160*c* may be disposed outside the casing that surrounds the right side mirror. Alternatively, the right camera 160*c* may be disposed on an area outside a right front door, a right rear door or right fender. Also, a rear camera 160*d* may be disposed near a rear number plate or trunk switch. A front camera 160*a* may be disposed near an emblem or radiator grill.

The processor 170 may synthesize the images captured in all directions to provide an around view image from the top view of the vehicle. When the around view image is generated, boundaries are generated among image areas. These boundaries may be naturally displayed by image blending. Also, a ceiling camera 160*e* may be disposed on the ceiling of the vehicle to capture images of the front, rear, left and right of the vehicle.

Such a camera 160 may also include an image sensor and an image processing module. The camera 160 may process a still image or video that is obtained by the image sensor (e.g., CMOS or CCD). Also, the image processing module may process the still image or video acquired through the image sensor to extract necessary information, and deliver the extracted image information to the processor 170.

Also, the driver assistance apparatus 100 may include the outside alarm unit 180 that outputs an alarm to the outside. Specifically, the outside alarm unit 180 may include a directivity speaker 181 that outputs an audible alarm, and/or an indicator output unit 183 that displays a visible alarm.

Firstly, the directivity speaker 181 is a speaker that may emit sound in a desired direction. Since the directivity speaker 181 may provide an audible alarm only to a specific alarm target 10 and deliver sound including alarm information, it is possible to deliver an intention to the alarm target 10 and provide a warning and decrease damage from noise.

Figure 8:
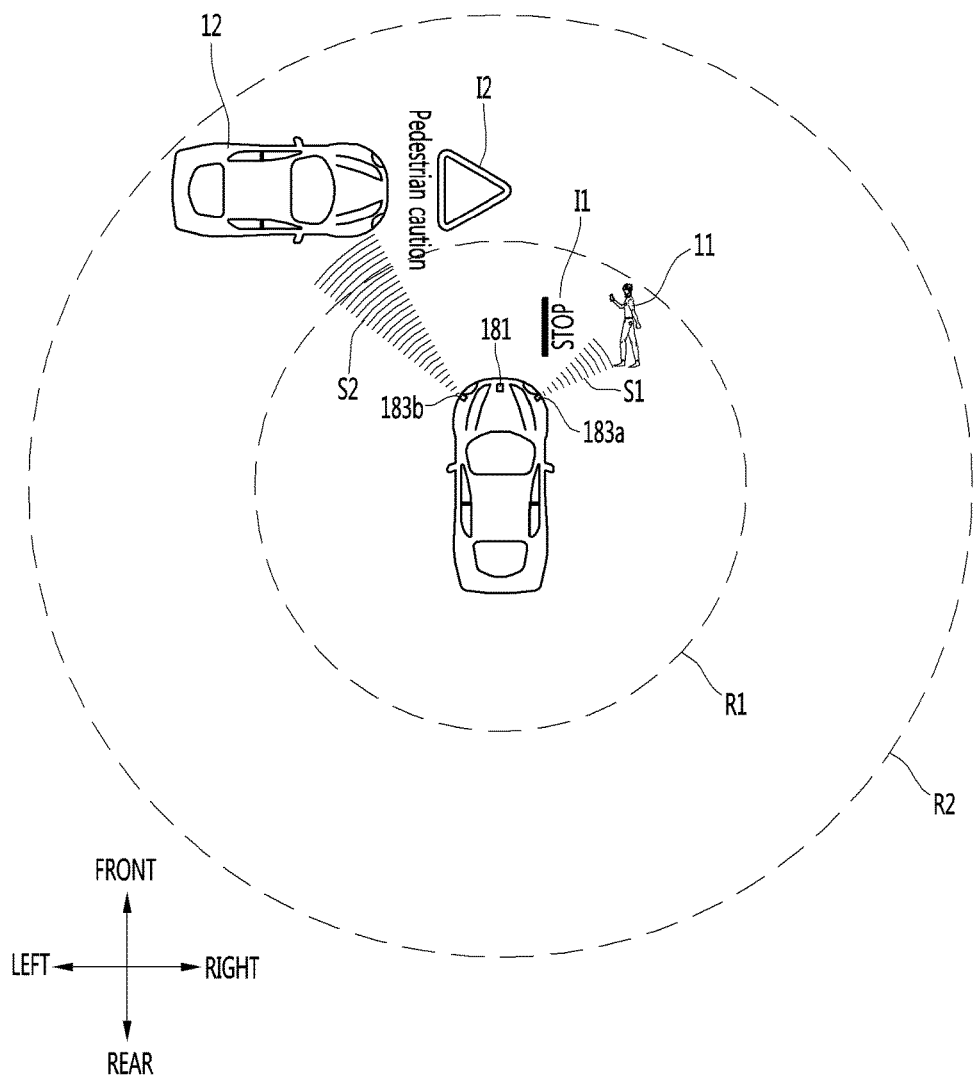
FIG. 8 is a diagram for explaining an outside alarm unit according to an embodiment.

For example, referring to FIG. 8, the directivity speaker 181 may output the audible alarm only to a first alarm target 11 that is placed at the front right of the vehicle and output the audible alarm only to a second alarm target 12 that is placed at the front left thereof. In this case, the details of the output audible alarm may be different from each other so that it is possible to deliver alarm information suitable for the alarm target 10.

The directivity speaker 181 may include a column speaker or line speaker but is not limited thereto. In addition, the indicator output unit 183 may display an indicator representing alarm information, by light outside the vehicle. For example, the indicator output unit 183 may irradiate a laser to the road surface near the alarm target 10 to project an image of an indicator onto the road surface to display the indicator.

The indicator output unit 183 may display the indicator on a specific area around the vehicle and display the indicator that represents the alarm information. For example, referring to FIG. 8, the indicator output unit 183 may display a first indicator I1 that represents "Stop", to the first alarm target 11 that is placed at the front right of the vehicle, and display a second indicator 12 that represents "Watch out pedestrian", to the second alarm target 12 that is placed at the front left of the vehicle.

That is, the outside alarm unit 180 may output visible and/or audible alarm to the alarm target 10 according to state information on the alarm target 10 to effectively provide the alarm to the alarm state without outside, visible and auditory pollution. In addition, the driver assistance apparatus 100 may include a display unit that displays information on a driver assistance function.

Such a display unit 185 may include a plurality of display units. Specifically, the display unit 185 may include a first display unit 185*a* that projects and displays an image onto the windshield W of the vehicle. That is, the first display unit 185*a* may be a head up display (HUD) and include a projection module projecting an image onto the windshield W. In addition, since a projected image projected by the projection module has predetermined transparency, a user may simultaneously see the projected image and a view after the projected image.

The projected image displayed on such a first display unit 185*a* may overlap a reflected image reflected to the window shield W to implement augmented reality (AR). For example, referring to FIG. 3, the first display unit 185*a* may display images H1 to H4 that display the candidate alarm targets 11 to 14 for alarm target 10 selection.

Also, the display unit 185 may include a second display unit 185*b* that is separately installed in the vehicle and displays an image. Specifically, the second display unit 185*b* may be the display of a vehicle navigation device or the front cluster inside the vehicle.

Also, the second display unit 185*b* may include at least one of a liquid crystal display (LCD), a thin film transistor-liquid crystal display (TFT LCD), an organic light-emitting diode (OLED), a flexible display, a 3D display, and an e-ink display.

Such a second display unit 185*b* may be integrated with a touch input unit to form a touch screen. Also, the driver assistance apparatus 100 may further include the audio output unit 187 and the power supply unit 190. Specifically, the audio output unit 187 may output, through sound, a description on the function of the driver assistance apparatus 100, a message checking whether to execute the function or the like. That is, the driver assistance apparatus 100 may supplement a description on the function of the driver assistance apparatus 100 through the sound output of the audio output unit 185, in addition to a visual display through the display unit 185.

Also, the power supply unit 190 may receive external power or internal power by the control of the processor 170 to supply power needed for the operation of each component. Lastly, the driver assistance apparatus 100 may include the processor 170 that controls the overall operations of each unit in the driver assistance apparatus 100.

Also, the processor 170 may control at least some of the components discussed with reference to FIG. 2, in order to execute an application program. Furthermore, the processor 170 may combine and operate at least two of the components in the driver assistance apparatus 100 in order to execute the application program.

The processor 170 may be implemented by using at least one of an application specific integrated circuit (ASIC), a digital signal processor (DSP), a digital signal processing device (DSPD), a programmable logic device (PLD), a field programmable gate array (FPGA), a processor 170, a controller, a micro-controller, a microprocessor, and electrical units for executing other functions. In addition, such a processor 170 may be controlled by a control unit or control various functions of the vehicle through the control unit.

Figure 9:
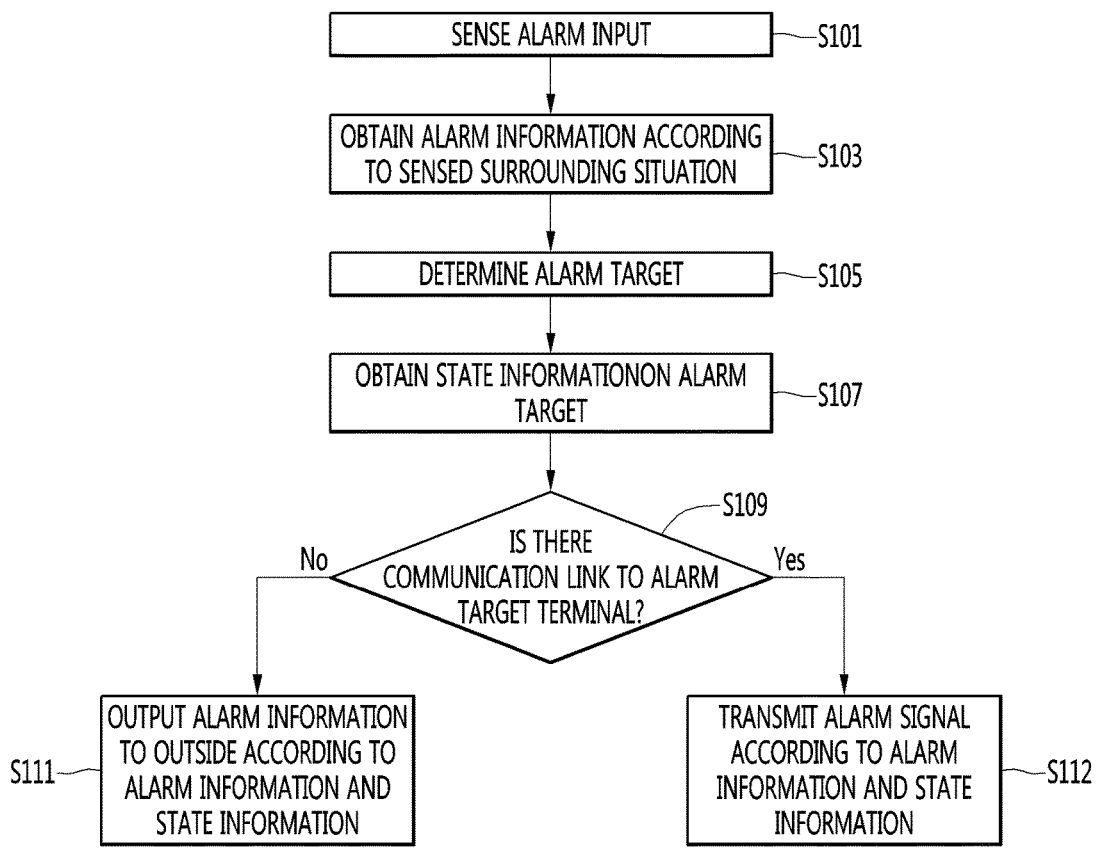
FIG. 9 is a flowchart of the process of executing, by a processor according to an embodiment, a vehicle's outside alarm function.

In the following, the process of controlling, by the processor 170, components to execute a vehicle's outside alarm function is described in more detail with reference to FIG. 9. Firstly, the processor 170 may sense an alarm input in step S101. Specifically, the processor 170 may enable the vehicle's outside alarm function to start when sensing the alarm initiation input of a user through the input unit 110.

Also, even without the user input, the processor 170 may automatically determine a situation requiring an alarm based on at least one of image information, sensor information, communication information, or monitoring information, and enable the vehicle's outside alarm function to start.

Next, the processor 170 may sense a situation around a vehicle and acquire alarm information, in step S103. Specifically, the processor 170 may acquire image information, sensor information, communication information or monitoring information and sense the situation around the vehicle from the acquired information.

For example, the processor 170 may specify, as the alarm target 10, a pedestrian crossing according to traffic light around the vehicle, acquire time information on a pedestrian signal from communication information and provide, to a pedestrian, an alarm that includes information on a signal time along with a warning "Watch out when crossing". In addition, the processor 170 may determine the alarm target 10 in step S105.

In particular, the processor 170 may determine, among surrounding objects, a type that may be the alarm target 10, and specify as the alarm target 10 when a single alarm target 10 is detected. For example, the processor 170 may detect an object that may be the alarm target 10, among objects that are captured from image information, and specify the candidate alarm target 10.

Specifically, the processor 170 may determine that an object including a person, such as a pedestrian, another vehicle, and a two-wheeled vehicle, among objects detected from image information is the candidate alarm target 10. Also, the processor 170 may also determine that an object possessing the terminal 200 is the candidate alarm target 10.

Also, the processor 170 may detect a plurality of candidate alarm targets 10 and specify the nearest candidate alarm target 10 as the alarm target 10. Also, the processor 170 may detect a plurality of candidate alarm targets 10, and sense the alarm target 10 selection/input of the user through the input unit 110 to specify the alarm target 10.

Also, the processor 170 may specify that the candidate alarm target 10 being in danger of collision among candidate alarm targets 10 is the alarm target 10. Also, the processor 170 may also determine that a plurality of alarm targets 10 within a predetermined radius is the candidate alarm target 10.

The determination of the alarm target 10 may vary according to a situation around a vehicle as well as a type of an object. For example, the processor 170 may specify around a crosswalk that a pedestrian who prepares for crossing or is crossing is the alarm target 10. Also, the processor 170 may specify on the side street that pedestrians who overlap the driving route of the vehicle are the alarm target 10.

Next, the processor 170 may acquire state information on the alarm target 10 in step S107. Specifically, the processor 170 may detect, from sensor information, communication information or monitoring information, communication with the terminal 200 of the alarm target 10, terminal 200 screen activation, sound activation, telephone conversation mode activation, music mode activation, the usage state of the terminal 200 of the alarm target 10, the directional relationship and distance between the vehicle and the alarm target 10, or the moving direction of the alarm target 10 or the like to acquire state information on the alarm target 10.

In addition, the processor 170 may check from the acquired state information on the alarm target 10 whether the alarm target 10 possesses the terminal 200 and whether it is possible to transmit an alarm signal to the terminal 200 in step S109. For example, the processor 170 may check through the communication unit 120 whether it is possible to transmit an alarm signal to the terminal 200 that corresponding to the position of the alarm target 10.

Specifically, when the terminal 200 occupying the position of an object receives wireless data from the communication unit 120 and transmits a corresponding feedback signal, the processor 170 may determine that the object possessing the terminal 200 is the alarm target 10 and there is a situation in which it is possible to perform alarm communication with the terminal 200 of the alarm target 10. In addition, it is possible to obtain, from the feedback signal, information on terminal 200 screen activation, sound activation, telephone conversation mode activation and music mode activation to further acquire the terminal 200 usage state of the alarm target 10 as state information.

Also, the processor 170 may detect from image information that a pedestrian is using the terminal 200, and detect the terminal 200 usage state. In particular, the processor 170 may detect, from the image information, seeing the terminal 200 screen, performing a telephone conversation, or enjoying music. In addition, the processor may determine an alarm unit and an alarm method according to state information on the alarm target 10 and provide a corresponding alarm to the alarm target 10.

Specifically, when it is possible to transmit an alarm signal, the processor 170 may transmit alarm information and/or an alarm signal according to state information on the alarm target 10 to the terminal 200 through the communication unit 120 to enable the terminal 200 to output the alarm in step S112.

The processor 170 may transmit an alarm signal along with an alarm unit and an alarm method by which the terminal 200 outputs the alarm, based on the terminal 200 usage state of the alarm target 10. For example, when sensing that the alarm target 10 sees the screen of the terminal 200 (e.g., terminal 200 screen activation), the processor 170 may provide the alarm by an alarm method that the alarm pops up on the terminal 200 screen. That is, when the alarm target 10 sees the terminal 200 screen and thus may not look around, it is possible to provide a warning "Caution" to the terminal 200 screen so that the alarm target 10 may effectively identify the alarm.

Also, when sensing that the alarm target 10 is performing a telephone conversation with the terminal 200, the processor 170 may decrease telephone conversation sound for a while and output an alarm as terminal 200 voice. Also, when sensing that the alarm target 10 is listening to music with the terminal 200, the processor 170 may decrease telephone sound for a while and output an alarm as terminal 200 voice.

That is, when the alarm target 10 concentrates his or her attention on the telephone conversation or music and thus may not look around, it is possible to provide a warning "Caution" through the terminal 200 voice so that the alarm target 10 may effectively identify the alarm.

Also, when sensing that the terminal 200 of the alarm target 10 is in a standby state, the processor 170 may transmit an alarm through the outside sound output unit or haptic module of the terminal 200. In addition, when the screen of the terminal 200 is activated, it is possible to display alarm information.

Also, the processor 170 may transmit an alarm signal including alarm information, exceeding a message beyond a simple warning. In particular, the processor 170 may transmit, to the terminal 200, an alarm signal that includes at least one of intention information that a user desires to deliver to the alarm target 10, traffic information around the alarm target 10, an action recommended for the alarm target 10, and a situation around the alarm target 10.

For example, the processor 170 may transmit the alarm signal along with a moving route, a recommended action, such as caution or stop, or surrounding traffic signal information so that they are displayed on the terminal 200 of the alarm target 10. When it is difficult to transmit the alarm signal, the processor 170 may provide an alarm through the outside alarm unit 180 in step S112.

Specifically, the processor 170 may transmit the alarm signal along with an alarm unit and an alarm method by which the terminal 200 outputs the alarm, based on position information on the alarm target 10. For example, the processor 170 may provide a sound alarm to the alarm target 10 through the directivity speaker 181 according to the position of the alarm target 10.

Also, the processor 170 may display an alarm as an indicator to the alarm target 10 through the indicator output unit 183 according to the position and moving direction of the alarm target 10. Also, the processor 170 may transmit an alarm signal including alarm information, exceeding a message beyond a simple warning.

In particular, the processor 170 may output an alarm that includes at least one of intention information that a user desires to deliver to the alarm target 10, traffic information around the alarm target 10, an action recommended for the alarm target 10, and a situation around the alarm target 10. For example, the processor 170 may represent a moving route, a recommended action, such as caution or stop, or surrounding traffic signal information, through a sound alarm or indicator.

As described earlier, the driver assistance apparatus 100 has an advantage in that it is possible to decrease the danger of a traffic accident and provide a smooth driving condition because the driver assistance apparatus provides the alarm by using the most effective unit and method based on state information on the alarm target 10 to enable smooth communication.

The terminal 200 of the alarm target 10 that outputs the alarm in response to the request of the driver assistance apparatus 100 is described in more detail. The alarm target 10 may possess various terminals 200 according to the type of the alarm target 10. For example, a pedestrian may possess a smart phone and a vehicle or two-wheeled vehicle may include a navigation device.

Figure 10:
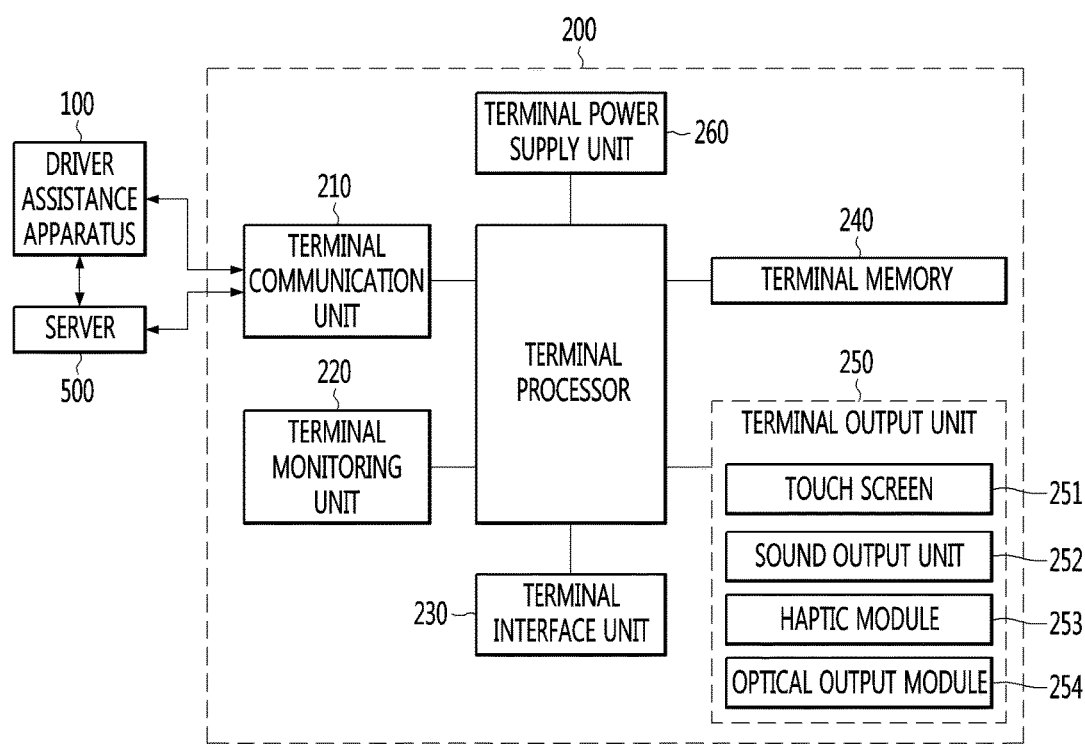
FIG. 10 is a block diagram of a terminal assisting a vehicle's outside alarm function according to an embodiment.

Specifically, referring to FIG. 10, the terminal 200 of the alarm target 10 according to an embodiment may include a terminal communication unit 210, a terminal monitoring unit 220, a terminal interface unit 230, a terminal memory 240, a terminal output unit 250, and a terminal power supply unit 260. Since the units of the terminal 200 shown in FIG. 10 are not essential for implementing the terminal 200, the terminal 200 described in the present disclosure may have more or less components than those enumerated above.

The terminal communication unit 210 may perform wireless data communication with the driver assistance apparatus 100. Specifically, the terminal communication unit 210 may transmit a terminal usage state to the driver assistance apparatus 100. For example, the terminal communication unit 210 may transmit a feedback signal for whether the alarm target 10 has possessed the terminal 200, and the feedback signal may include terminal 200 screen activation, sound activation, telephone conversation mode activation, music mode activation, or the like.

Also, the terminal communication unit 210 may receive an alarm signal from the driver assistance apparatus 100. For example, the terminal communication unit 210 may receive an alarm signal that requests to output at least one of visible, tactile and audible alarms. Also, the terminal communication unit 210 may transmit data relating to delivering an intention from the terminal 200 to the driver assistance apparatus 100.

The terminal communication unit 210 may perform wireless communication by using wireless data communication. The wireless data communication may include technology standards or communication modes for mobile communication. Also, the terminal communication unit 210 may also perform wireless communication by using a wireless internet technology and short range communication.

Also, the terminal monitoring unit 220 may obtain the terminal 200 usage state of the alarm target 10. Specifically, the terminal monitoring unit 220 may sense biometric information on the alarm target 10 to recognize the usage state of the alarm target 10. For example, the terminal monitoring unit 220 may tract the eyesight of the alarm target 10 to be capable of recognizing whether the alarm target 10 sees the screen of the terminal 200.

In addition, the terminal interface unit 230 may include the terminal interface that receives data on a vehicle's outside alarm function or transmits, to the outside, the signal processed or generated by the terminal 200 processor. In addition, the terminal memory 240 may store many application programs or applications executed on the terminal 200 or data and commands for the operation of the vehicle's outside alarm function.

At least some of the application programs may be downloaded from an external server through wireless communication. Also, at least some of the application programs may exist in the terminal 200 for the fundamental functions (e.g., a driver assistance function) of the terminal 200 when the terminal comes out of the factory.

The application program may be stored in the terminal memory 240 and installed on the terminal 200 to perform an operation (or function) according to an alarm request signal of the vehicle's outside alarm function by the terminal 200 processor. The terminal memory 240 may include, as hardware, at least one of various types of storage mediums, including a flash memory type memory, a hard disk type memory, a solid state disk (SSD) type memory, a silicon disk drive (SDD) type memory, a multimedia card micro type memory, a card type memory (e.g., an SD or XD memory), a random access memory (RAM), an static random access memory (SRAM), a read-only memory (ROM), an electrically erasable programmable read-only memory (EEPROM), a programmable read-only memory (PROM), a magnetic memory, a magnetic disk, and an optical disk.

Also, the terminal output unit 250 may include at least one of a touch screen 251, a sound output unit 252, a haptic module 253, and an optical output module 254 to output an alarm. Specifically, the terminal output unit 250 is used to generate a sight, hearing or touch related alarm, may include at least one of the sound output unit 252, the haptic module, and the optical output module, and may include the touch screen 251 in which a display unit and a touch sensor forms a mutual layer structure.

Figure 11A:
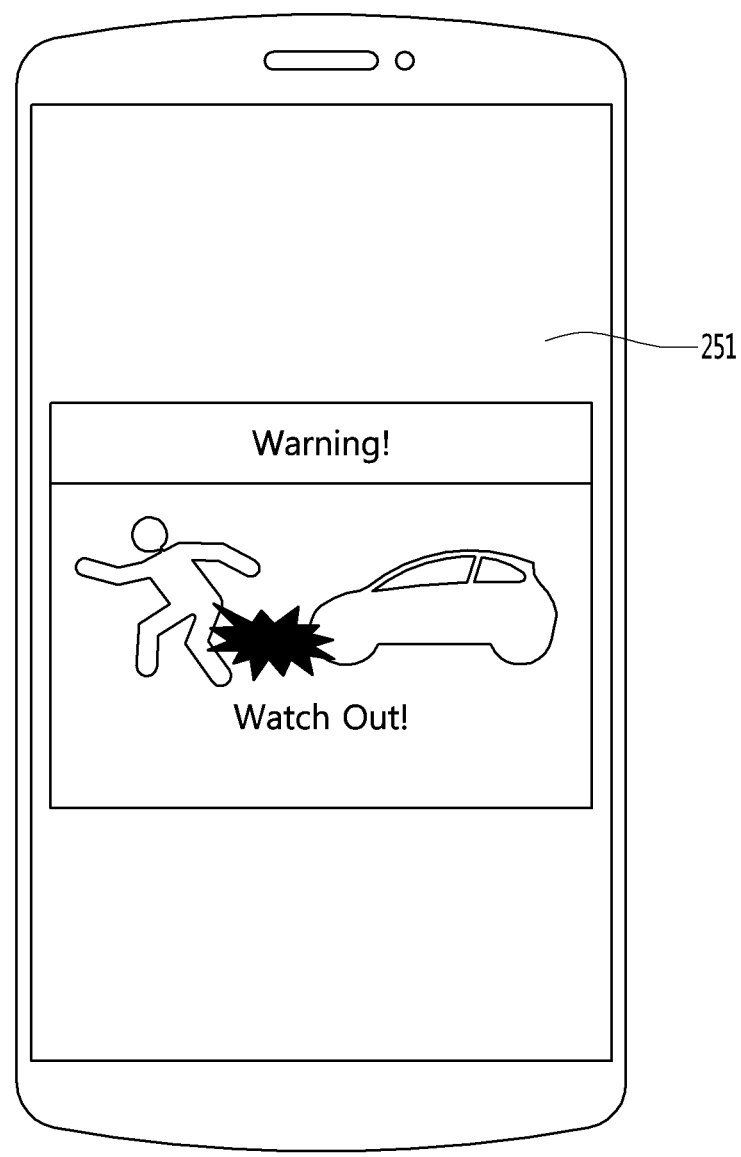
FIGS. 11a to 11c include examples of a method of executing a vehicle's outside alarm function using a terminal according to an embodiment.

In addition, the touch screen 251 may function as a user input unit that provides an input interface between the terminal 200 and the alarm target 10 and at the same time, provide an output interface between the mobile terminal 200 and the alarm target 10. In addition, it is possible to display a pop-up window that represents alarm information through the touch screen 251. For example, referring to FIG. 11*a*, the touch screen 251 may display the pop-up window displaying alarm information that there is the danger of collision, to provide an alarm to the alarm target 10.

In addition, the sound output unit 252 may output audio data stored in the memory or received from the terminal communication unit 210 in a call signal reception mode, a telephone conversation mode, a recording mode, an alarm output mode, or the like. The sound output unit 252 also outputs a sound signal relating to a function (e.g., an alarm message receiving sound) performed by the terminal 200. The sound output unit 252 may include a receiver, a speaker, a buzzer or the like.

Figure 11B:
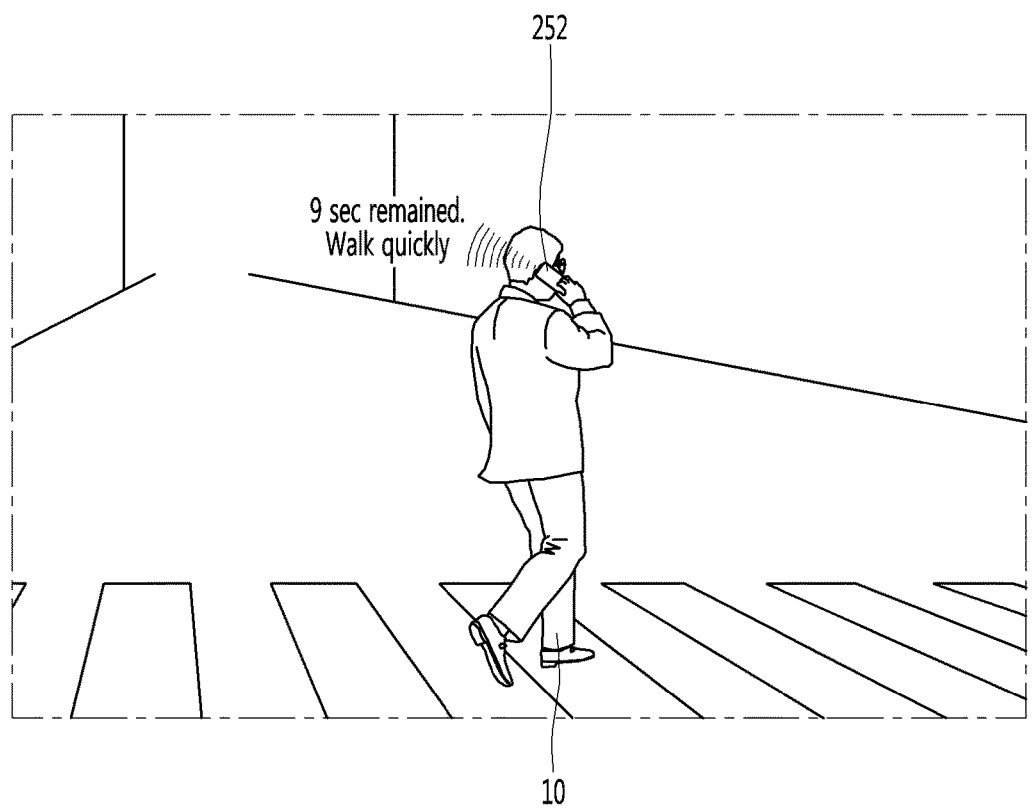

For example, referring to FIG. 11*b*, the sound output unit 252 may output voice received from the terminal communication unit 210 in the telephone conversation mode, lower voice when an alarm signal is received and output sound representing alarm information. Also, the sound output unit 252 may also output an alarm through sound even when the alarm target 10 does not use the terminal 200.

Also, the haptic module 253 generates various tactile effects that the alarm target 10 may feel. A representative example of the tactile effects that the haptic module 253 generates may be vibration. The intensity and pattern of vibration generated from the haptic module 253 may be controlled by the selection of the alarm target 10 or the setting of the control unit. For example, the haptic module 253 may output different vibrations in combination or sequentially.

Also, in addition to the vibration, the haptic module 253 may generate various tactile effects including an effect resulting from stimulus, such as a pin arrangement moving perpendicularly to touch skin surface being in touch, the jet force and suction force of the air through a jet or intake, the grazing of the skin surface, the touch of an electrode, electrostatic force or the like, and an effect resulting from a thermal feedback using a device capable of performing heat absorption or heat emission.

Figure 11C:
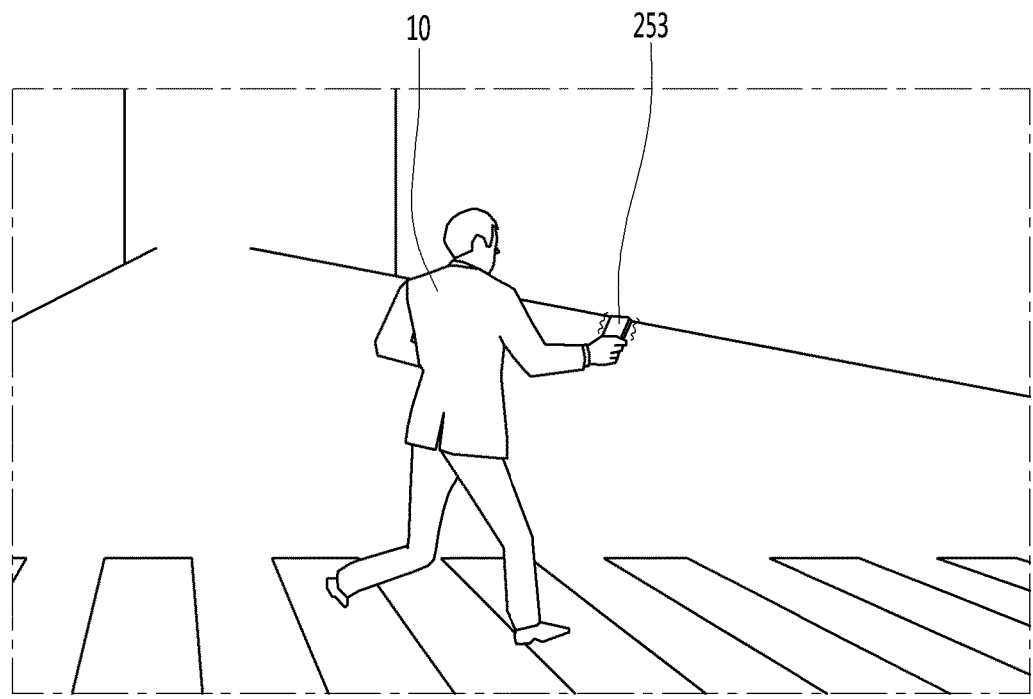
Figure 12:
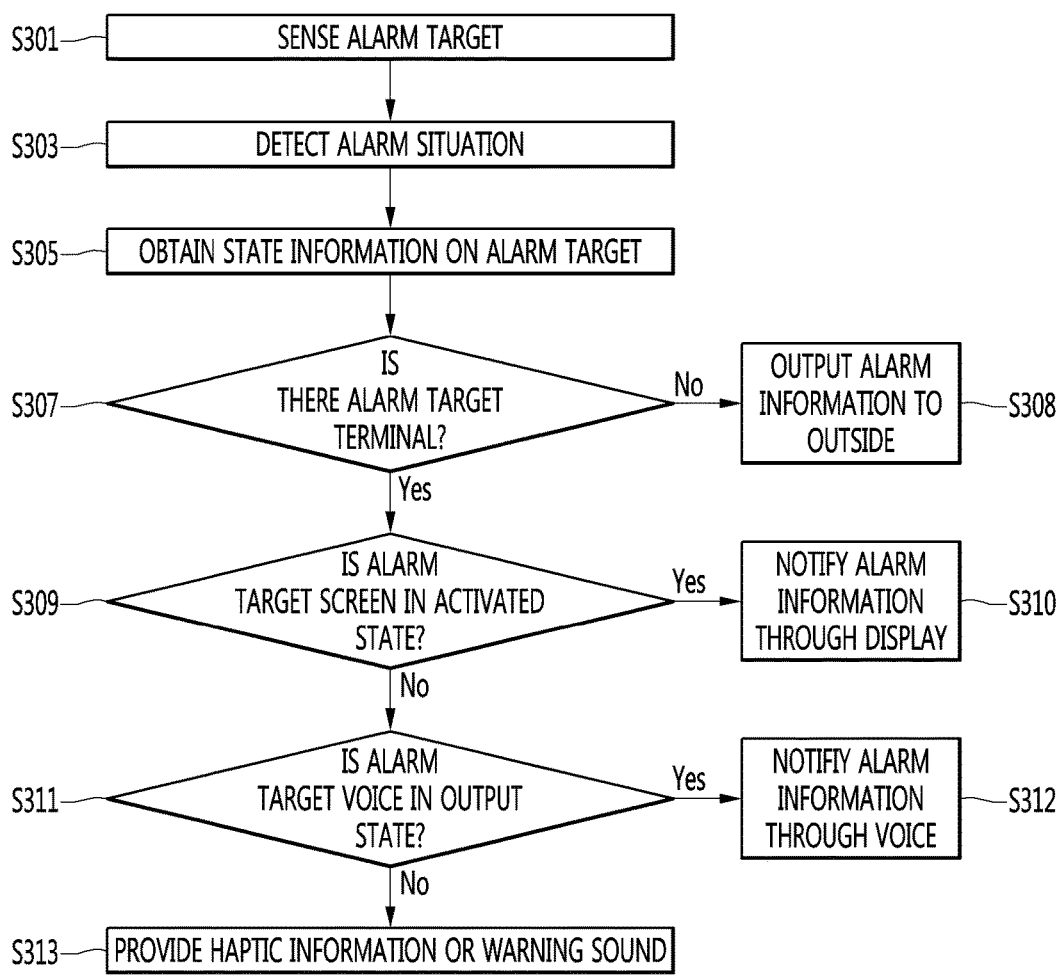
FIG. 12 is a flowchart of a vehicle's outside alarm method according to an embodiment.

Also, it is also possible to implement the haptic module 253 so that it is possible to deliver a tactile effect through a direct touch and a user may feel a tactile effect through the kinesthesia of his or her finger or arm. The haptic module 253 may be in plurality according to the configuration aspect of the terminal 200. For example, referring to FIG. 11*c*, the haptic module 253 may provide an alarm to the alarm target 10 through a vibration output.

Also, the optical output module 254 uses light from a light source to output a signal for notifying the occurrence of an event. An example of the event occurring by the terminal 200 may include alarm signal reception, message reception, call signal reception, a missing call, an alarm, a schedule notification, e-mail reception, information reception through an application, or the like.

A signal that the optical output module 254 outputs is implemented when the terminal 200 emits a single or a plurality of lights to the front or rear surface. The signal output may end when the terminal 200 senses that the alarm target 10 has checked the alarm.

In the following, the method of providing, by the above-described driver assistance apparatus 100 and terminal 200, the alarm to the alarm target 10 is described in more detail with reference to FIGS. 12 to 17. In the following, a particular embodiment where a vehicle's outside alarm function is executed when a vehicle is placed at a crosswalk and the alarm target 10 is around the crosswalk is described as an example.

Figure 13A:
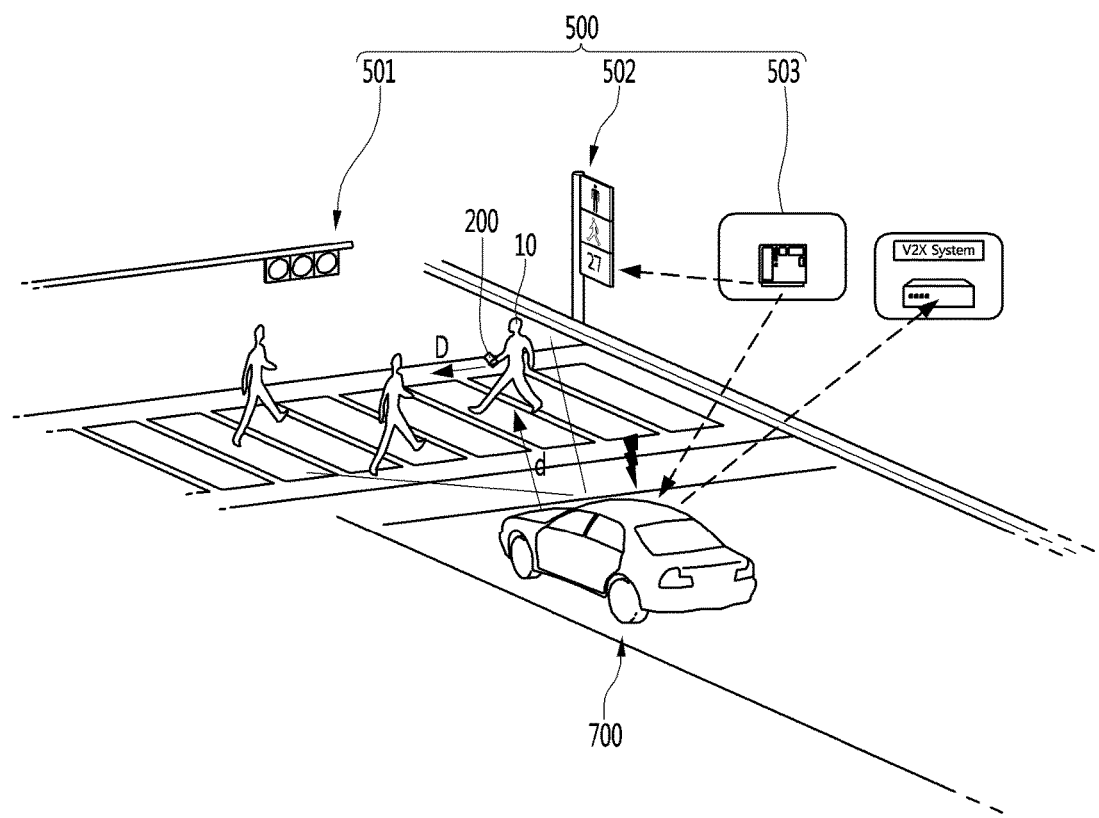
FIG. 13a shows a situation in which a vehicle's outside alarm function according to an embodiment is executed.
Figure 13B:
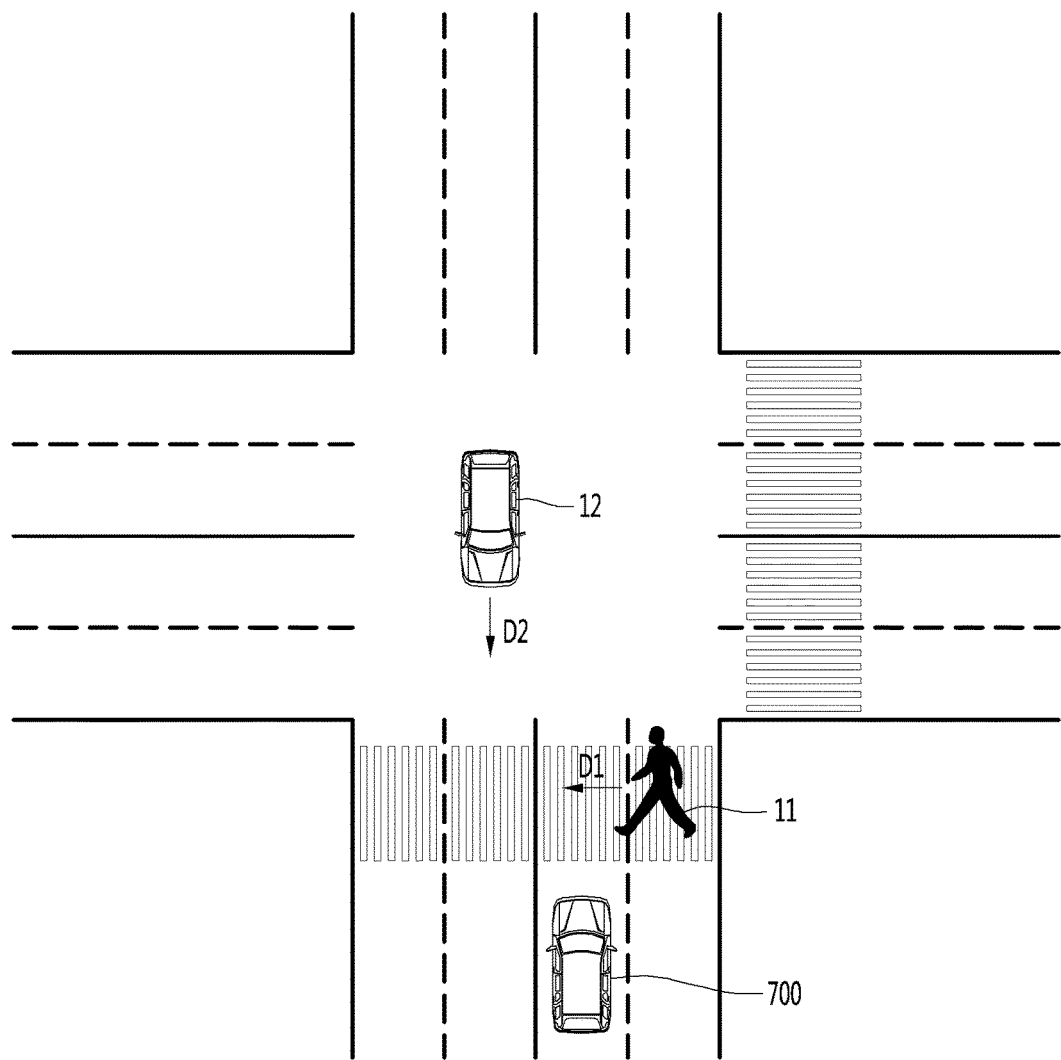

Firstly, the alarm target 10 may be sensed for the execution of an outside alarm function in step S301. Referring to FIG. 13*a*, the driver assistance apparatus 100 in the vehicle may sense objects around the vehicle through a sensor unit or camera and detect the alarm target 10 among the objects. In addition, the driver assistance apparatus 100 may acquire information on an alarm situation through the sensor unit, the camera or a communication.

Also, the driver assistance apparatus 100 may also determine the alarm target 10 by user selection through the input unit 110. In addition, the alarm situation may be detected in step S303. Specifically, the driver assistance apparatus 100 may detect the alarm situation based on at least one of a user input, image information, sensor information, communication information or monitoring information.

In addition, the driver assistance apparatus 100 may generate alarm information according to the alarm situation and provide the alarm representing the alarm information so that it is possible to deliver, to the alarm target 10, an intention relating to the alarm situation exceeding a simple warning.

Also, the driver assistance apparatus 100 may also sense the alarm situation through an alarm input. In addition, it is possible to acquire state information on the alarm target 10 in step S305. For example, referring to FIG. 13*b*, the driver assistance apparatus 100 may detect the first alarm target 11 that is a pedestrian crossing a crosswalk and the second alarm target 12 that is another vehicle entering the crosswalk.

In addition, the driver assistance apparatus 100 may acquire state information on the first alarm target 11 and the second alarm target 12, and detect that a situation in which there is the danger of collision is the alarm situation, when the danger of collision between the first alarm target 11 and the second alarm target 12 is sensed based on the state information. For example, the driver assistance apparatus 100 may detect a situation in which there is the danger of collision when the moving direction D1 of the first alarm target 11 cross the moving direction D2 of the second alarm target 12.

Figure 14A:
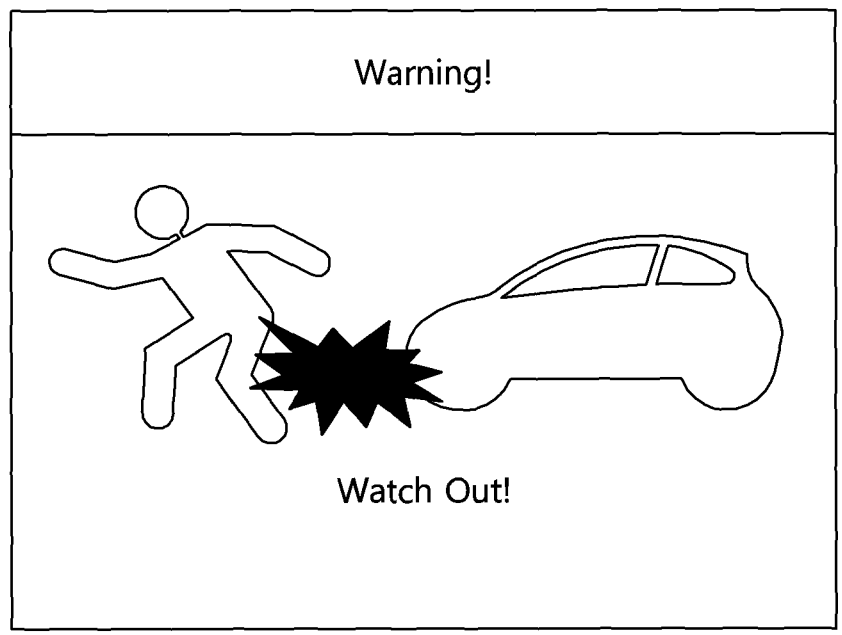
FIG. 14a is an example of an image that represents alarm information in FIG. 13b.

In addition, the driver assistance apparatus 100 may generate alarm information representing a situation in which there is the danger collision and provide an alarm including the alarm information. For example, as shown in FIG. 14a, the driver assistance apparatus 100 may provide an alarm representing alarm information, such as an intuitive image that represents the danger of collision between the alarm target 10 and a vehicle.

Figure 14B:
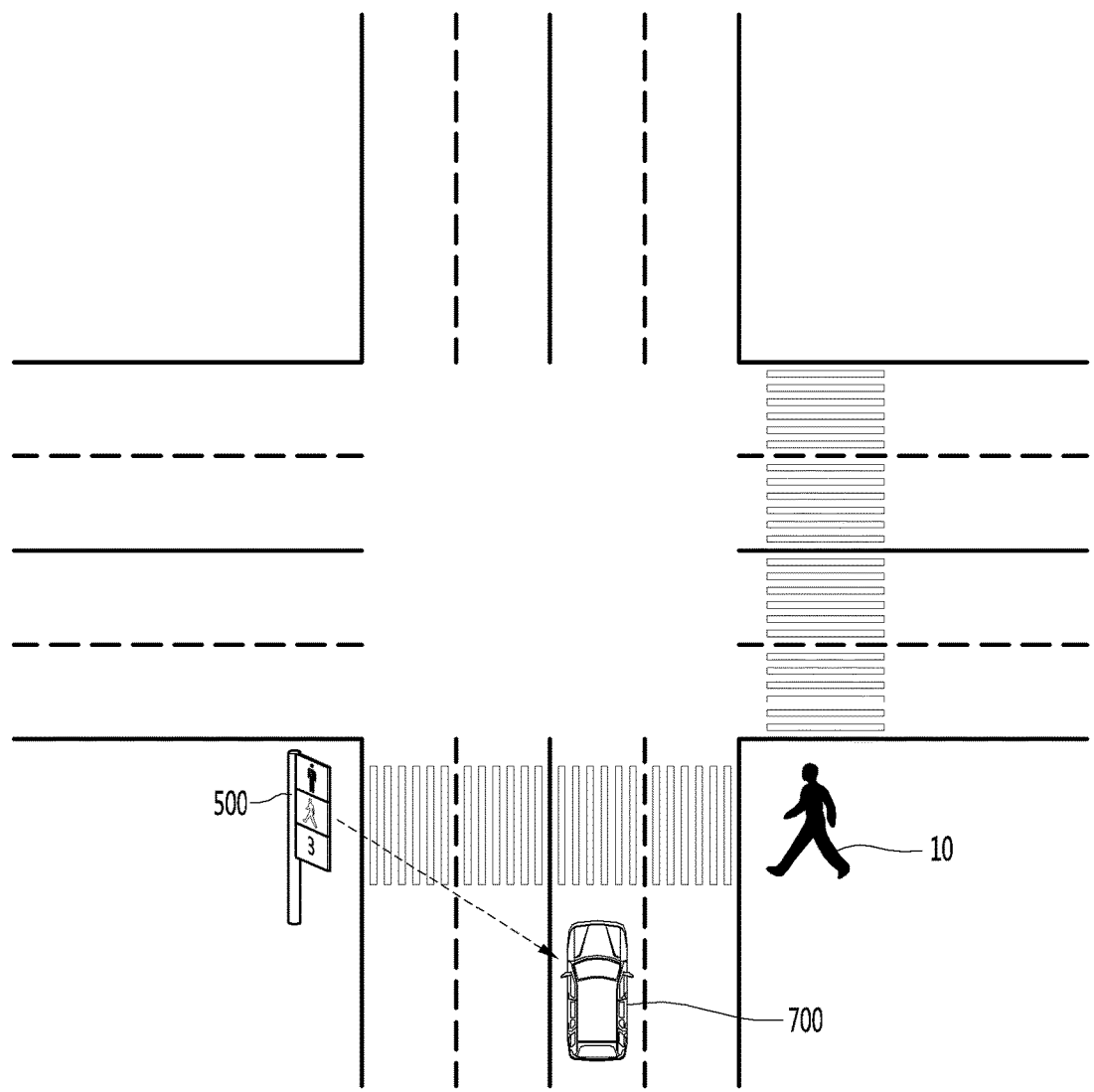

In another example, referring to FIG. 14b, the driver assistance apparatus 100 may detect the alarm target 10 that is a pedestrian seeking to cross a crosswalk, and acquire state information on the alarm target 10 and communication information on a traffic signal 500. In addition, the driver assistance apparatus 100 may detect an alarm situation "Do not cross" when it is identified from communication information that a time remaining for pedestrian crossing is shorter than or equal to a predetermined time and the moving direction of the alarm target 10 faces the crosswalk.

Figure 15A:
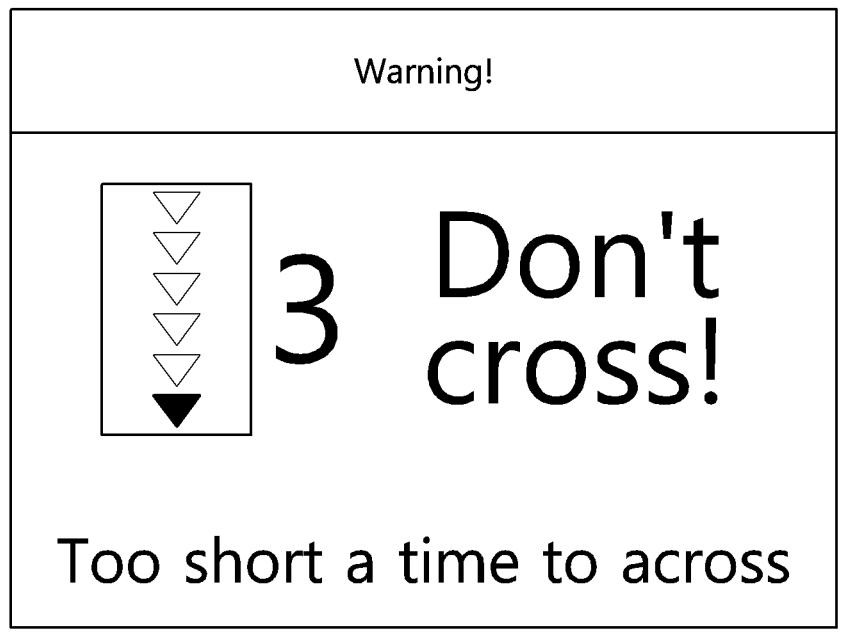
FIG. 15a is an example of an image that represents alarm information in FIG. 14b.

In addition, the driver assistance apparatus 100 may generate alarm information representing the alarm situation "Do not cross" and provide an alarm including the alarm information. For example, as shown in FIG. 15a, the driver assistance apparatus 100 may provide an alarm representing alarm information, such as an intuitive image that represents inhibiting the crossing of the alarm target 10 and a remaining time of the signal 500.

Figure 15B:
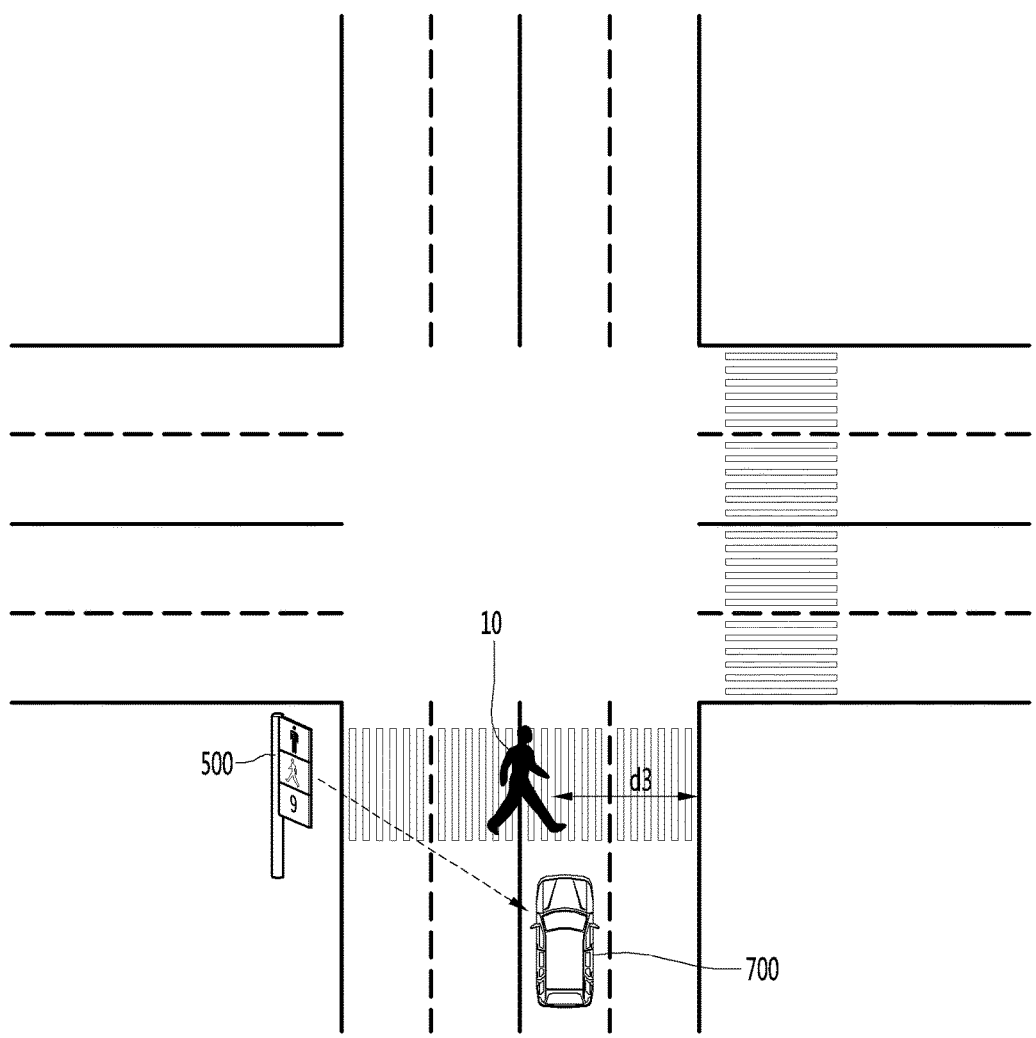

In another example, referring to FIG. 15b, the driver assistance apparatus 100 may detect the alarm target 10 that is a pedestrian crossing a crosswalk, and acquire state information on the alarm target 10. In addition, the driver assistance apparatus 100 may detect an alarm situation "Walk quickly" when it is identified from communication information that a time remaining for pedestrian crossing is shorter than or equal to a predetermined time and the alarm target 10 is crossing.

Figure 16A:
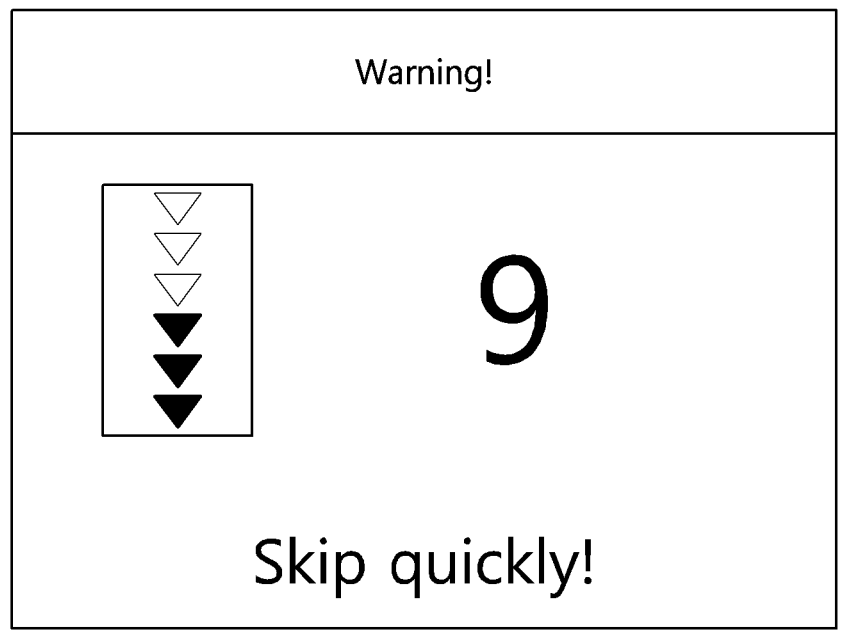
FIG. 16a is an example of an image that represents alarm information in FIG. 15b.

In addition, the driver assistance apparatus 100 may generate alarm information representing the alarm situation "Walk quickly" and provide an alarm including the alarm information. For example, as shown in FIG. 16a, the driver assistance apparatus 100 may provide an alarm representing alarm information, such as an intuitive image that represents urging the crossing of the alarm target 10 and a remaining time of the signal 500.

That is, the driver assistance apparatus 100 may sense an alarm situation that includes state information on the alarm target 10 and alarm information, and generate an alarm representing the alarm information. An alarm may be provided according to state information on the alarm target 10.

An alarm unit and an alarm method may be determined according to whether the alarm target 10 possesses the terminal 200, in step S307. When the alarm target 10 has not possessed the terminal 200 or it is difficult to transmit an alarm signal to the terminal 200, an alarm may be provided through an external output in step S308.

Figure 16B:
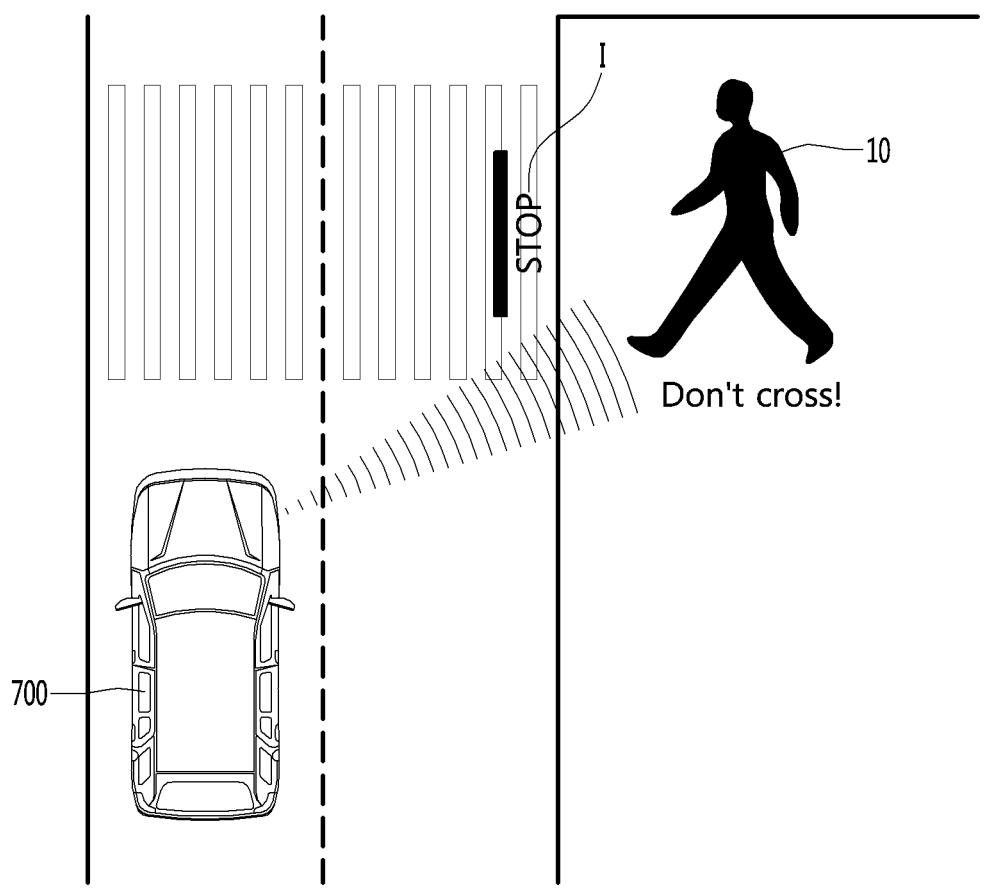
FIG. 16b represents a method of outputting the alarm according to state information on an alarm target according to an embodiment.

For example, referring to FIG. 16b, the driver assistance apparatus 100 may output a message "Do not cross" to the alarm target 10 through a sound to provide an alarm in the alarm situation "Do not cross". In this case, a sound output may be a directivity sound output toward the alarm target 10.

In addition, in the alarm situation "Do not cross", the driver assistance apparatus 100 may display an indicator I representing the message "Do not cross" on the road surface around the alarm target 10 to provide an alarm. Specifically, a stop indicator I may be displayed on the road surface of the moving direction of the alarm target 10.

The alarm through the external output may also be provided along with a terminal 200 alarm. When an alarm signal is transmitted to the terminal 200, an alarm may be provided through the output of the terminal 200 according to the usage state of the terminal 200. It may be determined whether the screen of the terminal 200 has been activated in step S309.

In addition, when the screen of the terminal 200 has been activated, it is possible to use the activated screen of the terminal 200 to provide an alarm in step S310. Specifically, when it is detected that the alarm target 10 is seeing the terminal 200 screen, an indication representing alarm information may be output on the terminal 200 screen to provide the alarm.

Figure 16C:
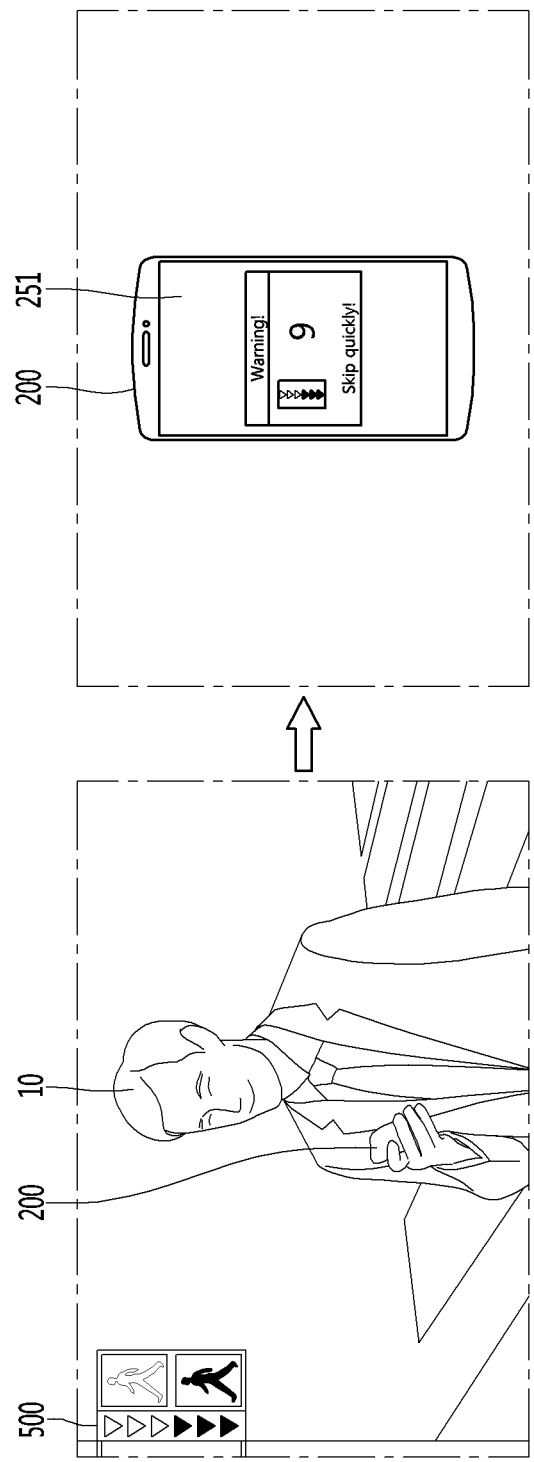
Figure 16D:
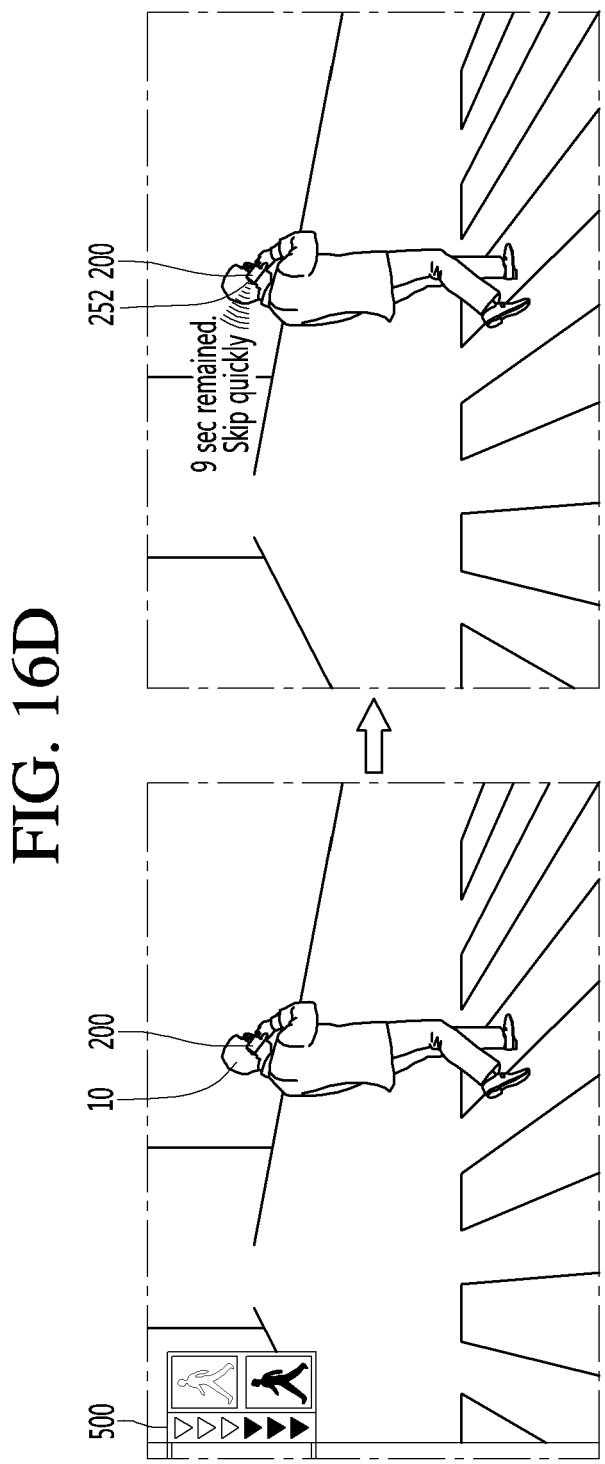

For example, referring to FIG. 16c, in the situation "Walk quickly", seeing the terminal 200 while the alarm target 10 crosses a crosswalk may be state information on the alarm target 10. In order to effectively provide an alarm from state information on the alarm target 10, the terminal 200 of the alarm target 10 may display, on the touch screen 251, a pop-up image that urges to cross and representing the remaining time of a signal.

In addition, it may be determined whether the voice output of the alarm target 10 has been activated in step S311. When the voice output of the terminal 200 has been activated, it is possible to provide an alarm through the activated voice output. For example, referring to FIG. 16d, in the situation "Walk quickly", performing a telephone conversation while the alarm target 10 crosses a crosswalk may be state information on the alarm target 10. In order to effectively provide an alarm from state information on the alarm target, the terminal 200 may lower the telephone conversion voice of the terminal 200 of the alarm target 10 and output a message urging to cross through sound.

If the alarm target 10 is in a state in which it does not use the terminal 200, it is possible to provide an alarm through a haptic or warning sound alarm output in step S313. For example, referring to FIG. 17, when state information on the alarm target 10 is verified that the alarm target 10 crosses without possessing the terminal 200, the alarm target 10 may identify an alarm through a haptic and/or sound alarm. In addition, when the alarm target 10 activates the screen of the terminal 200, it is possible to use the terminal 200 screen to provide an alarm.

As described earlier, a vehicle's outside alarm function may select an alarm unit to output an alarm according to state information on the alarm target 10 and determine the alarm method of the alarm unit to provide an alarm, thus it is possible to effectively provide the alarm to the alarm target 10. Also, the vehicle's outside alarm function has an advantage in that it is possible to output alarm information in an alarm situation to deliver an intention to the alarm target 10.

Figure 18:
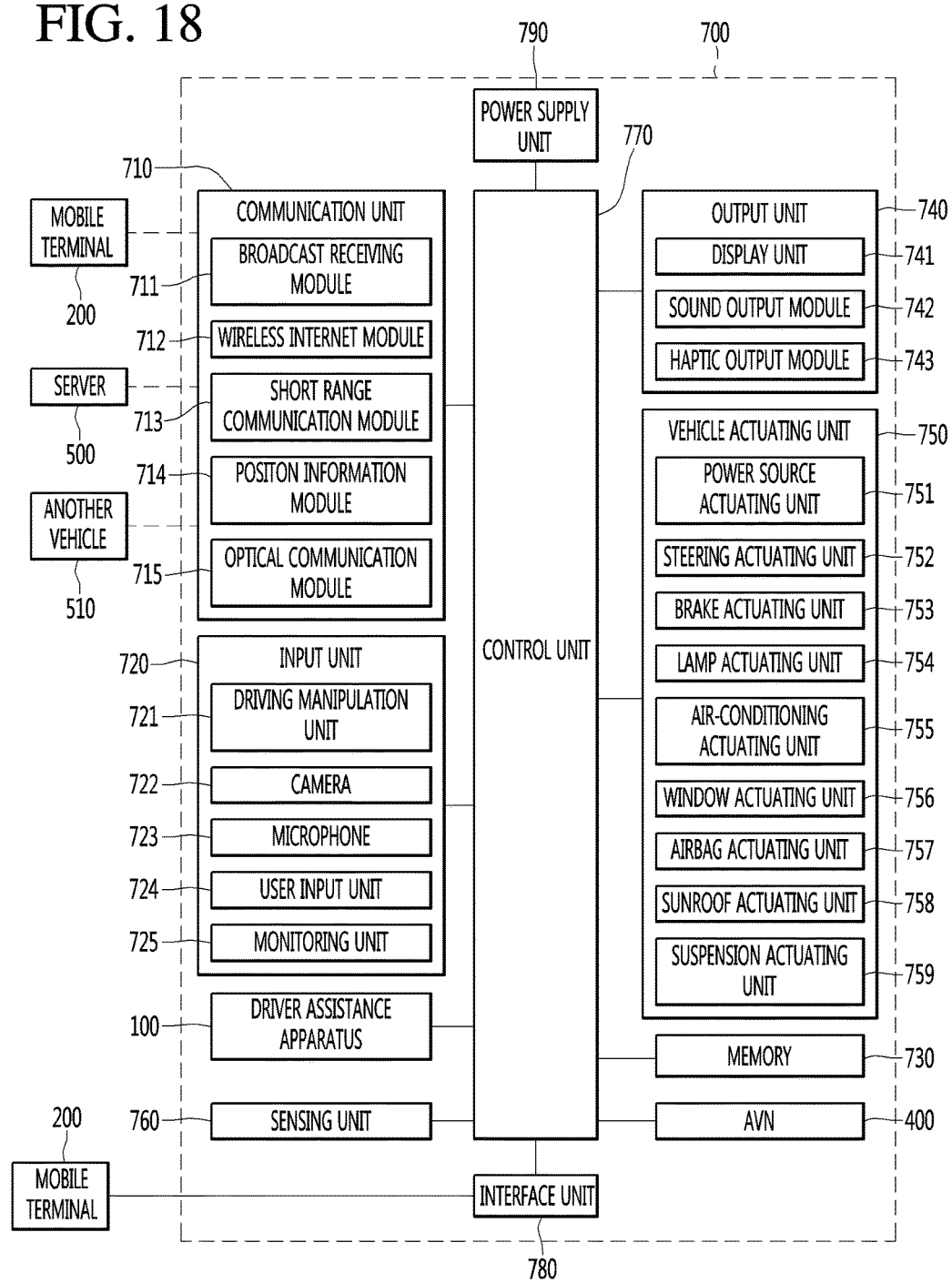
FIG. 18 is an example of an internal block diagram of a vehicle that includes the above-described driver assistance apparatus.

Referring to FIG. 18, the above-described driver assistance apparatus may be included in the vehicle. The vehicle may include a communication unit 710, an input unit 720, a sensing unit 760, an output unit 740, a vehicle actuating unit 750, a memory 730, an interface unit 780, a control unit 770, a power supply unit 790, a driver assistance apparatus, and an AVN apparatus 400.

The communication unit 710 may include one or more modules that enable wireless communication between the vehicle and the mobile terminal 200, between the vehicle and an external sever 500, or between the vehicle and another vehicle 510. Also, the communication unit 710 may include one or more modules that connect the vehicle to one or more networks.

The communication unit 710 may include a broadcast receiving module 711, a wireless internet module 712, a short-range communication module 713, a position information module 714, and an optical communication module 715. The broadcast receiving module 711 receives a broadcast signal or broadcast related information from an external broadcast management server through a broadcast channel. In this example, a broadcast includes a radio or TV broadcast.

The wireless internet module 712 indicates a module for wireless internet access and may be built into or external to the vehicle. The wireless internet module 712 is configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 712 transmits/receives data according to at least one wireless internet technology including internet technologies not listed above. For example, the wireless internet module 712 may exchange data with the external server 500 wirelessly. The wireless internet module 712 may receive weather information or road traffic information (e.g., TPEG) from the external server 500.

The short-range communication module 713 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

Such a short-range communication module 713 may form a Wireless Area Network (WAN) to perform short-range communication between the vehicle and at least one external device. For example, the short-range communication module 713 may exchange data with the mobile terminal 200. The short-range module 713 may receive weather information or road traffic information (e.g., TPEG) from the mobile terminal 200. If a user gets in the vehicle, the mobile terminal 200 of the user and the vehicle may perform pairing on each other automatically or by the execution of an application by the user.

The position information module 714 is a module for acquiring the position of the vehicle and includes a GPS module as a typical example. For example, the vehicle may use a signal transmitted by a GPS satellite to acquire the position of the vehicle, when the GPS module is used.

The optical communication module 715 may include a light transmission unit and a light reception unit. The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an embodiment, the light transmission unit may include a plurality of light-emitting element arrays. According to an embodiment, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 510 through optical communication.

The input unit 720 may include the driving manipulation unit 721, a camera 195, a microphone 723, and a user input unit 724. The driving manipulation unit 721 receives a user input for driving the vehicle. (See FIGS. 2 and 3 for the following description.) The driving manipulation unit 721 may include the steering input unit 721A, a shift input unit 721D, an acceleration input unit 721C, and a brake input unit 721B.

The steering input unit 721A receives an input for the driving direction of the vehicle from a user. The steering input unit 721A may be formed in the form of a wheel so that a steering input may be performed by rotation. According to an embodiment, the steering input unit 721A may also be formed as a touch screen, touch pad or button.

The shift input unit 721D receives an input for the parking P, driving D, neutrality N, and rear movement R of the vehicle from the user. The shift input unit 721D may be formed in the form of a lever. According to an embodiment, the shift input unit 721D may also be formed as a touch screen, touch pad or button.

The acceleration input unit 721D receives a n input for the acceleration of the vehicle from the user. The brake input unit 721B receives an input for the speed decrease of the vehicle from the user. The acceleration input unit 721C and the brake input unit 721B may be formed in the form of a pedal. According to an embodiment, the acceleration input unit 721C or the brake input unit 721B may also be formed as a touch screen, touch pad or button.

The camera 722 may include an image sensor and an image processing module. The camera 722 may process a still image or video that is obtained by an image sensor (e.g., CMOS or CCD). The image processing module may process the still image or video acquired by the image sensor to extract necessary information and transmit the extracted information to the processor 770. The vehicle may include the camera 722 that captures images in front of the vehicle or images around the vehicle, and the monitoring unit 725 that captures an image of the interior of the vehicle. The monitoring unit 725 may acquire an image of a passenger. The monitoring unit 725 may acquire the image of the passenger for biometrics.

Although FIG. 18 shows that the monitoring unit 150 and the camera 722 are included in the input unit, the camera 722 may also be included in the driver assistance apparatus as described above. The microphone 723 may process an external sound signal into electrical data. The processed data may be used in various methods according to a function that is executed at the vehicle. The microphone 723 may convert a user's voice command into electrical data. The electrical data obtained through conversion may be transmitted to the control unit 770.

According to an embodiment, the camera 722 or the microphone 723 may also be a component that is included in the sensing unit 760, and not in the input 720. The user input unit 724 receives information from the user. When information is input through the user input unit 724, the control unit 770 may control the operation of the vehicle corresponding to the input information. The user input unit 724 may include a touch-type input unit or mechanical input unit. According to an embodiment, the user input unit 724 may be disposed at a region of a steering wheel. In this case, a driver may manipulate the user input unit 724 with his or her finger, holding the steering wheel.

The sensing unit 760 senses a signal relating to the driving of the vehicle. To this end, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor by steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on.

The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information. The biometric recognition information sensing unit may include a sensor that senses biometric recognition information of the passenger. In this case, the monitoring unit 150 and the microphone 723 may operate as sensors. The biometric recognition information sensing unit may acquire hand geometry information and facial recognition information through the monitoring unit 150.

The output unit 740 is used for outputting information processed by the control unit 770 and may include the display unit 741, the sound output unit 742, and the haptic output unit 743. The display unit 741 may display information processed by the control unit 770. For example, the display unit 741 may display vehicle related information. In this example, the vehicle related information may include vehicle control information for direct control over the vehicle or driver assistance information for a driving guide for a driver. Also, the vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display. The display unit 741 may form a mutual layer structure with a touch sensor or be integrally formed to implement a touch screen. The touch screen may function as the user input unit that provides an input interface between the vehicle and the user, and also provide an output interface between the vehicle and the user. In this case, the display unit 741 may include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this case, the driver may see information displayed on the cluster, maintaining forward view.

According to an embodiment, the display unit 741 may be implemented as a HUD. When the display unit 741 is implemented as the HUD, it is possible to output information through a transparent display that is installed on the windshield. Alternatively, the display unit 741 may include a projection module to output information by using image that is projected onto the windshield.

The sound output unit 742 converts an electrical signal from the control unit 770 into an audio signal and outputs the audio signal. To this end, the sound output unit 742 may include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a user may recognize an output. The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle. For example, when the power source is a fossil fuel based engine (not shown), the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor (not shown), the power source actuating unit 751 may control the motor. Thus, it is possible to control the speed, torque and so on of the motor. The steering actuating unit 752 may perform electronic control over a steering apparatus in the vehicle. Thus, it is possible to change the driving direction of the vehicle.

The brake actuating unit 753 may perform electronic control over a brake apparatus (not shown) in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner (not shown) in the vehicle. For example, when the temperature inside the vehicle is high, it is possible to operate the air conditioner so that cold air is supplied into the vehicle. The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation. The sunroof actuating unit 758 may perform electronic control over a sunroof apparatus (not shown) in the vehicle. For example, it is possible to open or close the sunroof.

The suspension actuating unit 759 may perform electronic control over a suspension apparatus (not shown) in the vehicle. For example, when the road surface is uneven, it is possible to control a suspension apparatus to reduce the vibration of the vehicle.

The memory 730 is electrically connected to the control unit 770. The memory 770 may store fundamental data on units, control data for operation control over the units, and input and output data. The memory 790 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface 730 may function as a path to various kinds of external devices that are connected to the vehicle. For example, the interface unit 780 may include a port connectable to the mobile terminal 200 and be connected to the mobile terminal 200 through the port. In this case, the interface unit 780 may exchange data with the mobile terminal 200.

The interface unit 780 may function as a path through which electrical energy is supplied to the mobile terminal 200. When the mobile terminal 200 is electrically connected to the interface unit 780, the interface unit 780 supplies electrical energy supplied from the power supply unit 790 to the mobile terminal 200 according to the control of the control unit 770.

The control unit 770 may control the overall operation of each unit in the vehicle. The control unit 770 may be named an electronic control unit (ECU). Such a control unit 770 may execute a function corresponding to a transmitted signal, according to the execution signal transmission of the driver assistance apparatus.

The control unit 770 may be implemented by using at least one of an ASIC, a DSP, a DSPD, a PLD, an FPGA, a processor, a controller, a micro-controller, a microprocessor, and other electrical units for executing functions. The control unit 770 may perform the role of the above-described processor 170. That is, the processor 170 of the driver assistance apparatus may be set directly to the control unit 770 of the vehicle. In such an embodiment, it may be understood that the driver assistance apparatus refers to some components of the vehicle. Alternatively, the control unit 770 may also control components to transmit information requested by the processor 170.

The power supply unit 790 may supply power required for the operation of each component according to the control of the control unit 770. In particular, the power supply unit 770 may receive power from a battery (not shown) in the vehicle.

The AVN apparatus 400 may exchange data with the control unit 770. The control unit 770 may receive navigation information from the AVN apparatus 400 or a separate navigation apparatus (not shown). In this example, the navigation information may include set destination information, route information according to the destination, vehicle driving related map information, or vehicle position information.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the inventive concept. A person skilled in the art may appreciate that many variations and applications not presented above may be implemented without departing from the essential characteristic of embodiments. For example, each component particularly represented in embodiments may be varied. In addition, it should be construed that differences related to such a variation and such an application are included in the scope of the inventive concept defined in the following claims.

The invention claimed is:

1. A driver assistance apparatus in a vehicle, the driving assistance apparatus comprising:
   a sensor unit configured to sense a surrounding of the vehicle;
   an alarm unit on the vehicle configured to output an alarm outside of the vehicle;
   a transceiver configured to provide wireless communication; and
   a processor configured to:
      detect a person included in the sensed surrounding of the vehicle,
      control the transceiver to transmit an alarm signal to a mobile terminal of the person to inform the person is in an alarm situation in response to a successful attempt to communicate with the mobile terminal of the person, and
      output an alarm via the alarm unit towards the person to inform the person is in the alarm situation in response to an unsuccessful attempt to communicate with the mobile terminal of the person.

2. The driving assistance apparatus of claim 1, wherein the processor is further configured to determine a usage state of the mobile terminal.

3. The driving assistance apparatus of claim 2, wherein the alarm signal transmitted to the mobile terminal requests the mobile terminal display a pop-up image of the alarm situation on a screen of the mobile terminal to provide an alarm when the determined usage state of the mobile terminal indicates the person is viewing the screen of the mobile terminal.

4. The driving assistance apparatus of claim 2, wherein the alarm signal transmitted to the mobile terminal requests the mobile terminal adjust a telephone conversation sound of the mobile terminal and output a sound of an alarm on the mobile terminal for the alarm situation when the determined usage state of the mobile terminal indicates the person performs a telephone conversation on the mobile terminal.

5. The driving assistance apparatus of claim 2, wherein the alarm signal transmitted to the mobile terminal requests the mobile terminal adjust a sound of music playing on the mobile terminal and output a sound of an alarm on the mobile terminal for the alarm situation when the determined usage state of the mobile terminal indicates the person is listening to the music on the mobile terminal.

6. The driving assistance apparatus of claim 2, wherein the alarm signal transmitted to the mobile terminal requests the mobile terminal output at least one of a tactile alarm and a warning sound alarm when the determined usage state of the mobile terminal indicates the person is not using the mobile terminal.

7. The driving assistance apparatus of claim 2, wherein the alarm signal transmitted to the mobile terminal requests the mobile terminal display a pop-up image for the alarm situation when the determined usage state of the mobile terminal indicates a screen of the mobile terminal is activated.

8. The driving assistance apparatus of claim 1, wherein the alarm unit includes a directivity speaker configured to output a sound for the alarm towards the person.

9. The driving assistance apparatus of claim 1, wherein the alarm unit includes an indicator output unit configured to display an indicator for the alarm situation around the person.

10. The driving assistance apparatus of claim 1, wherein the alarm situation is related to the person crossing a crosswalk, and
wherein the alarm signal transmitted to the mobile terminal requests the mobile terminal output an alarm related to the person crossing the crosswalk.

11. The driving assistance apparatus of claim 1, wherein the processor is further configured to confirm the successful attempt to communicate with the mobile terminal by receiving a feedback signal from the mobile terminal based on wireless data output through the transceiver.

12. A method of controlling a driver assistance apparatus in a vehicle, the method comprising:
sensing, via a sensor unit of the vehicle, a surrounding of the vehicle;
detecting, via a processor, a person included in the sensed surrounding of the vehicle;
transmitting, via a transceiver, to transmit an alarm signal to a mobile terminal of the person to inform the person is in an alarm situation in response to a successful attempt to communicate with the mobile terminal of the person, and
outputting, via an alarm unit, an alarm towards the person to inform the person is in the alarm situation in response to an unsuccessful attempt to communicate with the mobile terminal of the person.

13. The method of claim 12, further comprising:
determining, via the processor, a usage state of the mobile terminal.

14. The method of claim 13, wherein the alarm signal transmitted to the mobile terminal requests the mobile terminal display a pop-up image of the alarm situation on a screen of the mobile terminal to provide an alarm when the determined usage state of the mobile terminal indicates the person is viewing the screen of the mobile terminal.

15. The method of claim 13, wherein the alarm signal transmitted to the mobile terminal requests the mobile terminal adjust a telephone conversation sound of the mobile terminal and output a sound of an alarm on the mobile terminal for the alarm situation when the determined usage state of the mobile terminal indicates the person performs a telephone conversation on the mobile terminal.

16. The method of claim 13, wherein the alarm signal transmitted to the mobile terminal requests the mobile terminal adjust a sound of music playing on the mobile terminal and output a sound of an alarm on the mobile terminal for the alarm situation when the determined usage state of the mobile terminal indicates the person is listening to the music on the mobile terminal.

17. The method of claim 13, wherein the alarm signal transmitted to the mobile terminal requests the mobile terminal output at least one of a tactile alarm and a warning sound alarm when the determined usage state of the mobile terminal indicates the person is not using the mobile terminal.

18. The method of claim 13, wherein the alarm signal transmitted to the mobile terminal requests the mobile terminal display a pop-up image for the alarm situation when the determined usage state of the mobile terminal indicates a screen of the mobile terminal is activated.

19. The method of claim 12, wherein the alarm unit includes a directivity speaker configured to output a sound for the alarm towards the person.

20. The method of claim 12, wherein the alarm unit includes an indicator output unit configured to display an indicator for the alarm situation around the person.

* * * * *